US012638561B2

(12) United States Patent
Pacala et al.

(10) Patent No.: US 12,638,561 B2
(45) Date of Patent: *May 26, 2026

(54) SOLID-STATE ELECTRONIC SCANNING LASER ARRAY WITH HIGH-SIDE AND LOW-SIDE SWITCHES FOR INCREASED CHANNELS

(71) Applicant: Ouster, Inc., San Francisco, CA (US)

(72) Inventors: Angus Pacala, San Francisco, CA (US); Marvin Liu Shu, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,723

(22) Filed: Feb. 15, 2023

(65) Prior Publication Data

US 2023/0305118 A1 Sep. 28, 2023

Related U.S. Application Data

(63) Continuation of application No. 16/696,540, filed on Nov. 26, 2019, now Pat. No. 11,585,906.

(Continued)

(51) Int. Cl.
*G01S 7/484* (2006.01)
*G01S 7/481* (2006.01)
*G01S 17/10* (2020.01)

(52) U.S. Cl.
CPC ............ *G01S 7/484* (2013.01); *G01S 7/4817* (2013.01); *G01S 17/10* (2013.01)

(58) Field of Classification Search
CPC ......... G01S 7/484; G01S 7/4817; G01S 17/10
See application file for complete search history.

(56) References Cited

U.S. PATENT DOCUMENTS

| | | |
|---|---|---|
| 7,969,558 B2 | 6/2011 | Hall |
| 8,675,181 B2 | 3/2014 | Hall |
| | (Continued) | |

FOREIGN PATENT DOCUMENTS

| | | |
|---|---|---|
| CN | 104247566 A | 12/2014 |
| CN | 106725323 A | 5/2017 |
| | (Continued) | |

OTHER PUBLICATIONS

CN201980092370.3, "Office Action", Dec. 28, 2023, 24 pages.

(Continued)

*Primary Examiner* — Adam M Alharbi
(74) *Attorney, Agent, or Firm* — Kilpatrick Townsend & Stockton LLP

(57) ABSTRACT

An electronically scanning emitter array that includes a two-dimensional array of light emitters arranged in k emitter banks. Each of the k emitter banks can include a subset of the light emitters in the two-dimensional array and can be independently operable to emit light from its subset of emitters. The electronically scanning emitter array can further include first and second capacitor banks coupled to provide energy to the two-dimensional array of light emitters and emitter array driving circuitry coupled to the first and second capacitor banks and to the k emitter banks. Each of the first and second capacitor banks can include at least one capacitor. The emitter array driving circuitry can include a first high-side switch coupled between the first capacitor bank and a voltage source, a second high-side switch coupled between the second capacitor bank and the voltage source, and k/2 low-side switches coupled between the k emitter banks and ground; and the emitter driving circuitry can be configured to fire one emitter bank in the k emitter banks at a time according to a firing sequence until each of the k emitter banks are fired.

18 Claims, 11 Drawing Sheets

Related U.S. Application Data

(60) Provisional application No. 62/828,113, filed on Apr. 2, 2019, provisional application No. 62/784,918, filed on Dec. 26, 2018.

(56) References Cited

U.S. PATENT DOCUMENTS

| | | | |
|---|---|---|---|
| 8,767,190 | B2 | 7/2014 | Hall |
| 9,030,836 | B2 | 5/2015 | Park et al. |
| 9,236,705 | B2 | 1/2016 | Deppe |
| 9,245,874 | B2 * | 1/2016 | Demuynck ......... H01L 25/0753 |
| 9,551,791 | B2 | 1/2017 | Van Den Bossche et al. |
| 9,992,477 | B2 | 6/2018 | Pacala et al. |
| 10,063,849 | B2 | 8/2018 | Pacala et al. |
| 10,444,359 | B2 | 10/2019 | Pacala et al. |
| 2007/0024840 | A1 | 2/2007 | Fetzer et al. |
| 2015/0131080 | A1 | 5/2015 | Retterath et al. |
| 2017/0343653 | A1 | 11/2017 | Weinberg |
| 2018/0143324 | A1 | 5/2018 | Keilaf et al. |
| 2018/0299554 | A1 | 10/2018 | Van Dyck et al. |
| 2018/0301872 | A1 | 10/2018 | Burroughs et al. |
| 2018/0301875 | A1 * | 10/2018 | Burroughs .............. H01S 5/183 |
| 2018/0329062 | A1 | 11/2018 | Pacala et al. |
| 2018/0329065 | A1 | 11/2018 | Pacala et al. |
| 2019/0011561 | A1 | 1/2019 | Pacala et al. |
| 2019/0011567 | A1 | 1/2019 | Pacala et al. |
| 2019/0064355 | A1 | 2/2019 | Pacala et al. |
| 2020/0178361 | A1 * | 6/2020 | Oka ...................... G01S 7/4815 |

FOREIGN PATENT DOCUMENTS

| | | | |
|---|---|---|---|
| CN | 108028507 | A | 5/2018 |
| CN | 108603932 | A | 9/2018 |
| CN | 108885263 | A | 11/2018 |
| CN | 109073756 | A | 12/2018 |
| EP | 3045935 | A1 | 7/2016 |
| EP | 3316000 | A1 | 5/2018 |
| TW | 201141320 | A | 11/2011 |
| WO | 2017025958 | A1 | 2/2017 |
| WO | 2018065426 | A1 | 4/2018 |
| WO | 2018065427 | A1 | 4/2018 |
| WO | 2018065428 | A2 | 4/2018 |
| WO | 2018065429 | A1 | 4/2018 |
| WO | 2018122415 | A1 | 7/2018 |
| WO | 2018197441 | A1 | 11/2018 |

OTHER PUBLICATIONS

U.S. Appl. No. 16/696,540, Notice of Allowance, Mailed On Sep. 21, 2022, 8 pages.

Application No. EP19906205.0, Extended European Search Report, Mailed On Jun. 20, 2022, 10 pages.

Application No. PCT/US2019/067667, International Preliminary Report on Patentability, Mailed On Jul. 8, 2021, 9 pages.

Application No. PCT/US2019/067667, International Search Report and Written Opinion, Mailed On Feb. 27, 2020, 10 pages.

KR10-2021-7023679, "Office Action", Jul. 8, 2024, 7 pages.

CN201980092370.3, "Office Action", Aug. 28, 2024, 14 pages.

KR10-2021-7023679, "Notice of Decision to Grant", Mar. 4, 2025, 5 pages.

CN201980092370.3 , "Notice of Decision to Grant", Mar. 24, 2025, 6 pages.

EP19906205.0, "Intention to Grant", Apr. 23, 2025, 8 pages.

* cited by examiner

SOLID-STATE ELECTRONIC SCANNING LASER ARRAY WITH HIGH-SIDE AND LOW-SIDE SWITCHES FOR INCREASED CHANNELS

CROSS REFERENCE TO RELATED APPLICATIONS

This application is a continuation of U.S. Non-Provisional patent application Ser. No. 16/696,540 filed Nov. 26, 2019, which claims the benefit of U.S. Provisional Patent Application No. 62/828,113 filed Apr. 2, 2019 and claims the benefit of U.S. Provisional Patent Application No. 62/784,918, filed Dec. 26, 2018. Each of the Ser. No. 16/969,540, 62/828,113 and 62/784,918 applications are incorporated herein by reference in their entirety.

BACKGROUND

Light imaging, detection and ranging (LIDAR) systems measure distance to a target by illuminating the target with a pulsed laser light and measuring the reflected pulses with a sensor. Time-of-flight measurements can then be used to make a digital 3D-representation of the target. LIDAR systems can be used for a variety of applications where 3D depth images are useful including archaeology, geography, geology, forestry, mapping, construction, medical imaging and military applications, among others. Autonomous vehicles can also use LIDAR for obstacle detection and avoidance as well as vehicle navigation.

Some LIDAR systems include a mechanical, moving component that physically scans a transmitting and receiving element around a rotational angle of less than or equal to 360° to capture an image of a scene in a field. One example of such a system that can be used for obstacle detection and avoidance in vehicles is often referred to as a rotating or spinning LIDAR system. In a rotating LIDAR system, a LIDAR sensor is mounted, typically within a housing, to a column that rotates or spins a full 360 degrees. The LIDAR sensor includes coherent light emitters (e.g., pulsed lasers in the infrared or near-infrared spectrums) to illuminate a scene around the vehicle as the LIDAR sensor is continuously rotated through the scene. As the coherent light emitters spin around, they send pulses of radiation away from the LIDAR system in different directions in the scene. Part of the radiation, incident on surrounding objects in the scene, is reflected from these objects around the vehicle, and then these reflections are detected by the imaging system portion of the LIDAR sensor at different time intervals. The imaging system turns the detected light into electric signal.

In this way, information about objects surrounding the LIDAR system including their distances and shapes is gathered and processed. A digital signal processing unit of the LIDAR system can process the electric signals and reproduce information about objects in a depth image or a 3D point cloud that can be used as an aid in obstacle detection and avoidance as well as for vehicle navigation and other purposes. Additionally, image processing and image stitching modules can take the information and assemble a display of the objects around the vehicle.

Another type of mechanical LIDAR system scans a laser beam along a predetermined scan pattern using, for example, a mirror galvanometer. Some such systems can include a two-dimensional array of photosensors that are electronically scanned to coincide with the scan pattern of the laser beam. It can be challenging, however, to calibrate and synchronize the sensor array with laser beam when a mechanical system is employed for steering the beam.

Solid-state LIDAR systems also exist that do not include any moving mechanical parts. Instead of rotating through a scene, some solid state LIDAR systems flash an entire portion of a scene they intend to capture with light and sense the reflected light. In such systems, the transmitter includes an array of emitters that all emit light at once to illuminate the scene, and are thus sometimes referred to as "flash" LIDAR systems. Flash LIDAR systems are less complicated to make because of the lack of moving parts; however, they can require a large amount of power to operate since all of the emitters are activated at once and they can require a large amount of processing power to process signals from all the pixel detectors at once. Decreasing the number of light emitters can save power at the sacrifice of quality and resolution of the resulting image. The large amount of light emitted can also induce an undesirable amount of stray light that can generate noise at the receiving end, thereby decreasing the signal-to-noise ratio of the sensed signals and resulting in blurred images.

SUMMARY

Some embodiments of the invention pertain to stationary, solid-state LIDAR systems in which there is no spinning column or mirror galvanometers. Embodiments can capture the image of a scene at a high resolution and low power consumption and with improved accuracy, reliability, size, integration and appearance as compared to some currently available spinning LIDAR systems.

According to some embodiments, a solid state electronic scanning LIDAR system can include a scanning focal plane transmitting element and a scanning focal plane receiving element whose operations are synchronized so that the firing sequence of an emitter array in the transmitting element corresponds to a capturing sequence of a photosensor array in the receiving element.

In some embodiments the transmitting element and receiving element can each be coupled with image space telecentric bulk optics that collimate the transmitter and receiver fields of view, respectively, in object space. And, in some embodiments the emitter array can be an array of vertical-cavity surface-emitting lasers (VCSELs) and each photosensor in the photosensor array include a collection of photodetectors, such as single photon avalanche diodes (SPADs).

During operation, the emitter array can sequentially fire one or more columns of light emitters from the emitter array into a scene and the reflected light can be received by one or more corresponding columns of photosensors. By synchronizing the firing and capturing sequences, the solid-state scanning LIDAR system can efficiently capture images by only illuminating, at a given point in time, a certain amount of light from a set of emitters that can be efficiently detected by a corresponding set of photosensors, thereby minimizing excessive illumination of a scene and concentrating energy in a manner that makes the best possible use of the available power to the system.

Embodiments of the invention can include switches on both the high-side and low-side of the emitter array in order to increase the number of individually-addressable channels while enabling the individual channels to be driven at high power levels and minimizing the size of the control circuitry associated with the emitter array. The high-side switches can be coupled between a voltage source and capacitors that are configured to drive the emitter array. The high-side switches can be selectively activated to connect capacitors to the voltage source to charge the capacitors. The low-side switches can be selectively activated to discharge the capacitors through the emitter array to selectively fire banks of emitters in the array. The capacitors can be charged at lower current levels than the current levels delivered by the capacitors to drive the emitter array enabling the high-side switches to be smaller (i.e., take up less real estate) than the low-side switches that are required to handle higher current levels. In this manner, some embodiments of the invention provide further improvements on the use of available power to the system enabling increased brightness of the laser beams as compared to the brightness that would be provided if fewer independently-addressable channels were driven at a lower power levels. The increased brightness can, in turn, result in improved detection range and accuracy of the photosensor array.

In some embodiments, electronic scanning LIDAR systems herein can also utilize micro-optics to further improve the efficiency at which images of a scene are captured. The micro-optics can improve the brightness and intensity of light emitted from a transmitting element as well as minimize cross-talk between sensor pixels of a receiving element of the electrically scanning LIDAR system. For example, in some embodiments an aperture layer can be positioned in front of the photosensors. Each light emitter can correspond with an aperture in the aperture layer, and each aperture can correspond to a photosensor in the receiving element such that each light emitter corresponds with a specific photosensor in the receiving element. The aperture can mitigate the exposure of stray light on neighboring photosensors as well as narrow the field of view for a photosensor to a single point in the field.

Some embodiments pertain to an electronically scanning emitter array that includes a two-dimensional array of light emitters arranged in k emitter banks. Each of the k emitter banks can include a subset of the light emitters in the two-dimensional array and can be independently operable to emit light from its subset of emitters. The electronically scanning emitter array can further include first and second capacitor banks coupled to provide energy to the two-dimensional array of light emitters and emitter array driving circuitry coupled to the first and second capacitor banks and to the k emitter banks. Each of the first and second capacitor banks can include at least one capacitor. The emitter array driving circuitry can include a first high-side switch coupled between the first capacitor bank and a voltage source, a second high-side switch coupled between the second capacitor bank and the voltage source, and k/2 low-side switches coupled between the k emitter banks and ground; and the emitter driving circuitry can be configured to fire one emitter bank in the k emitter banks at a time according to a firing sequence until each of the k emitter banks are fired.

The k emitter banks can include a first plurality of emitter banks and a second plurality of emitter banks and the first capacitor bank can be coupled to the anodes of the first plurality of emitter banks and the second capacitor bank can be coupled to the anodes of the second plurality of emitter banks. In some embodiments the emitter array driving circuitry is configured to drive the emitter array in a plurality of consecutive emission cycles in which, during each emission cycle, the firing sequence fires each of the first plurality of emitter banks and then fires each of the second plurality of emitter banks. In other embodiments the emitter array driving circuitry is configured to drive the emitter array in a plurality of consecutive emission cycles in which, during each emission cycle, the firing sequence alternates between firing an emitter bank from the first plurality of emitter banks and an emitter bank from the second plurality of emitter banks.

In some embodiments an electronically scanning emitter array includes a two-dimensional array of light emitters arranged in k emitter banks and a plurality of capacitors arranged as l capacitor banks and coupled to provide energy to the two-dimensional array of light emitters. Each of the k emitter banks can include a subset of the light emitters in the two-dimensional array and can be independently operable to emit light from its subset of emitters and each of the l capacitor banks can include at least one capacitor.

The emitter array driving circuitry can include l high-side switches with each of the l high-side switches coupled between one of the l capacitor banks and a voltage source; and k/l low-side switches with each of the k/l low-side switches coupled between one the k emitter banks and ground. The emitter driving circuitry can be configured to fire one emitter bank in the k emitter banks at a time according to a firing sequence until each of the k emitter banks are fired.

Some embodiments of the invention pertain to a solid-state optical system that includes an electronically scanning emitter array as described herein along with an array of photosensors and sensor array readout circuitry coupled to the array of photosensors. The array of photosensors can include k photosensor banks with each of the k photosensor banks being paired with one of the k emitter banks, and the sensor array readout circuitry can be configured to synchronize the readout of each of the k photosensor banks within the array concurrently with the firing of its corresponding emitter bank in the k emitter banks so that each light emitter in the two-dimensional array of individual light emitters can be activated and each photosensor in the array of photosensors can be readout through one emission cycle.

A better understanding of the nature and advantages of embodiments of the present invention may be gained with reference to the following detailed description and the accompanying drawings. It is to be understood, however, that each of the figures is provided for the purpose of illustration only and is not intended as a definition of the limits of the scope of the invention. Also, as a general rule, and unless it is evident to the contrary from the description, where elements in different figures use identical reference numbers, the elements are generally either identical or at least similar in function or purpose.

DETAILED DESCRIPTION

Figure 1:
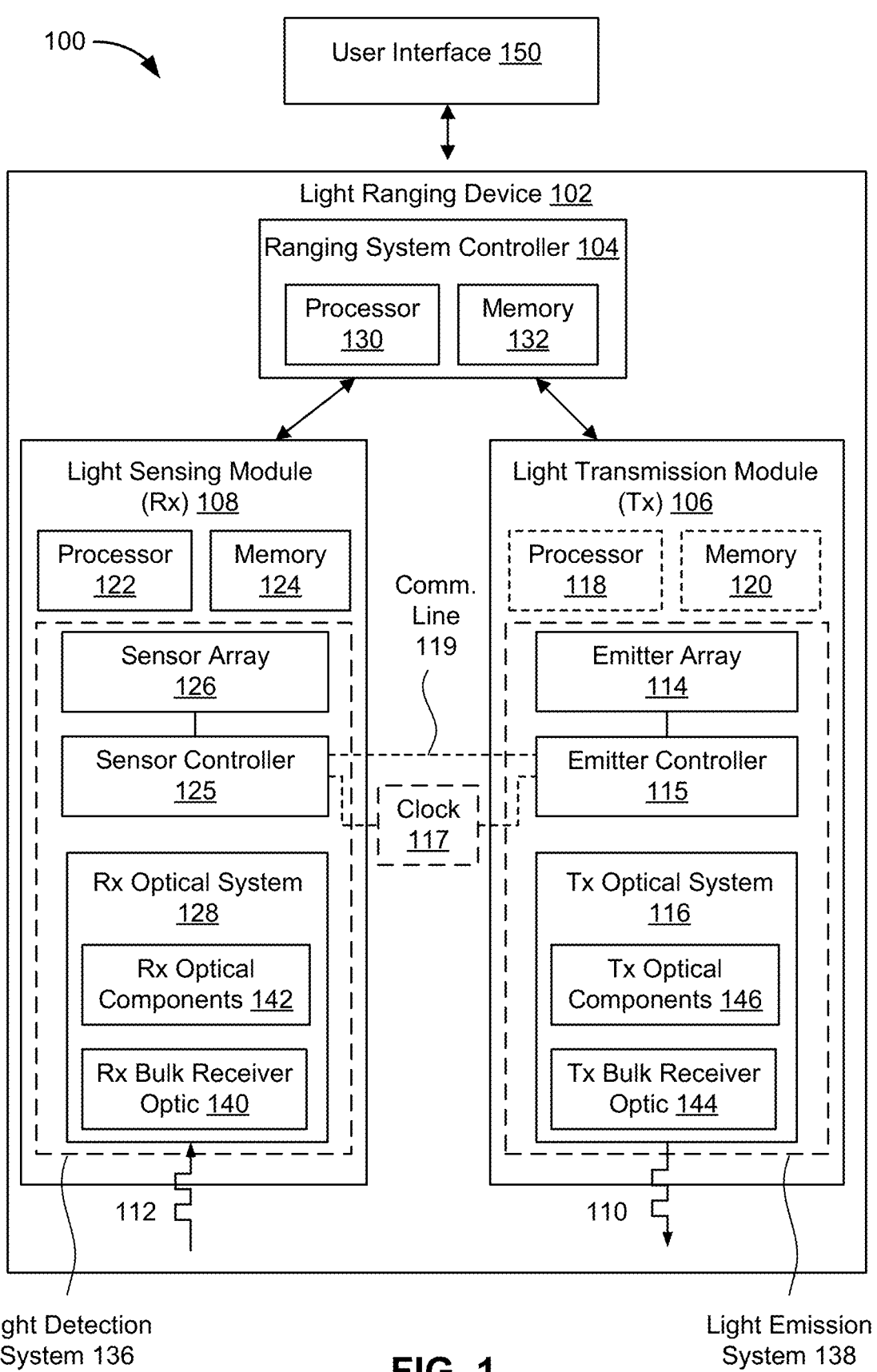
FIG. 1 is a block diagram of an exemplary solid state electronic scanning LIDAR system, according to some embodiments of the present invention.

In order to better understand and appreciate embodiments of the invention, reference is first made to FIG. 1, which is a simplified block diagram of an exemplary solid state electronic scanning LIDAR system 100 according to some embodiments of the present invention. Solid state electronic scanning LIDAR system 100 can include a light ranging device 102 and a user interface 150. Light ranging device 102 can include a ranging system controller 104, a light transmission (Tx) module 106 and a light sensing (Rx) module 108. Ranging data can be generated by light ranging device 102 by transmitting a stream of light pulses 110 from the light transmission module 106 to objects in a field of view surrounding light ranging device 102. Reflected portions 112 of the transmitted light are then detected by light sensing module 108 after some delay time. Based on the delay time, the distance to the reflecting surface can be determined. Other ranging methods can be employed as well, e.g. continuous wave, photodemodulation, Doppler, and the like.

Light transmission module 106 includes an emitter array 114 (e.g., a two-dimensional array of emitters) and a Tx optical system 116, which when taken together with emitter array 114 can form a light emission system 138. Tx optical system 116 can include a bulk transmitter optic 144 that is image-space telecentric. In some embodiments, Tx optical system 116 can further include one or more Tx optical components 146, such as an aperture layer and a lens layer that can be combined with emitter array 114 to form an array of micro-optic transmitter channels where each micro-optic transmitter channel can increase the brightness of beams emanating from the bulk transmitter optic and/or for beam shaping, beam steering or the like, as discussed further herein with respect to FIG. 11. Emitter array 114 or the individual emitters can be laser sources, such as vertical-cavity surface-emitting lasers (VCSEL), laser diodes, and the like. Tx module 106 can further include an optional processor 118 and memory 120, although in some embodiments these computing resources can be incorporated into ranging system controller 104. In some embodiments, a pulse coding technique can be used, e.g., Barker codes and the like. In such cases, memory 120 can store pulse-codes that indicate when light should be transmitted. In some embodiments, the pulse-codes are stored as a sequence of integers stored in memory.

Light sensing module 108 can include a sensor array 126 (e.g., a two-dimensional array of photosensors) in which each photosensor of sensor array 126 can correspond to a particular emitter of emitter array 114, e.g., as a result of a geometrical configuration of light sensing module 108 and Tx module 106. In some embodiments each photosensor (sometimes referred to herein as just a "sensor" or as a "pixel") can include a collection of photodetectors, e.g., SPADs or the like, while in other embodiments a photosensor can be a single photon detector (e.g., an APD). Light sensing module 108 includes a receiver optical sensing system 128, which when taken together with sensor array 126 can form a light detection system 136. In some embodiments, receiver optical sensing system 128 can include a receiver bulk receiver optic 140 and receiver optical components 142, such as an aperture layer, a lens layer and an optical filter, that can be combined with sensor array 126 to form an array of micro-optic receiver channels where each micro-optic receiver channel measures light that corresponds to an image pixel in a distinct field of view of the surrounding field in which light ranging device 102 is positioned.

Further details of Rx and Tx optical systems according to some embodiments of the invention are discussed below in conjunction with FIG. 10 and in commonly-assigned U.S. patent application Ser. No. 15/979,235, entitled "Optical Imaging Transmitter with Brightness Enhancement", filed on May 14, 2018, and incorporated herein by reference in its entirety for all purposes.

In some embodiments, sensor array 126 of light sensing module 108 is fabricated as part of a monolithic device on a single substrate (using, e.g., CMOS technology) that includes both an array of photosensors and a processor 122 and a memory 124 for signal processing the measured light from the individual photosensors (or groups of photosensors) in the array. The monolithic structure including sensor array 126, processor 122, and memory 124 can be fabricated as a dedicated ASIC. In another embodiment, sensor array 126 can be fabricated as a stack of two or more monolithic electronic devices ("semiconductor dies") bonded together into a single light sensing module 108 with electrical signals passing between them. In this embodiment, the top array of photosensors can be fabricated in a process that maximizes photosensing efficiency or minimizes noise while the other dies are optimized for lower power, high speed digital processing.

In some embodiments, optical components 142 can also be a part of the monolithic structure in which sensor array 126, processor 122, and memory 124 are a part. For example, an aperture layer, lens layer, and an optical filter layer of optical components 142 can be stacked over and bonded with epoxy to a semiconductor substrate having multiple ASICs fabricated thereon at the wafer level before or after dicing. For instance, the optical filter layer can be a thin wafer that is placed against the photosensor layer and then bonded to the photosensor layer to bond the optical filter layer with the photosensor layer to have the optical layer form part of the monolithic structure; the collimating lens layer can be injection molded onto the optical filter layer; and, the aperture layer can be formed by layering a non-transparent substrate on top of a transparent substrate or by coating a transparent substrate with an opaque film. Alternatively, the photosensor layer can be fabricated and diced, and the optical filter layer, collimating lens layer, and the aperture layer can be fabricated and diced. Each diced photosensor layer and optical layers can then be bonded together to form a monolithic structure where each monolithic structure includes the photosensor layer, optical filter layer, collimating lens layer, and the aperture layer. By bonding the layers to the ASIC, the ASIC and the bonded layers can form a monolithic structure. The wafer can then be diced into devices, where each device can be paired with a respective bulk receiver optic 140 to form light sensing module 108. In yet other embodiments, one or more components of light sensing module 108 can be external to the monolithic structure. For example, the aperture layer may be implemented as a separate metal sheet with pin-holes.

As mentioned above, processor 122 (e.g., a digital signal processor (DSP), microcontroller, field programmable gate array (FPGA), and the like) and memory 124 (e.g., SRAM) can perform signal processing of the raw histograms from the individual photon detectors (or groups of detectors) in the array. As an example of signal processing, for each photon detector or grouping of photon detectors, memory 124 can accumulate counts of detected photons over successive time bins, and these time bins taken together can be used to recreate a time series of the reflected light pulse (i.e., a count of photons vs. time). This time-series of aggregated photon counts is referred to herein as an intensity histogram (or just histogram). Processor 122 can implement matched filters and peak detection processing to identify return signals in time. In addition, processor 122 can accomplish certain signal processing techniques, such as multi-profile matched filtering to help recover a photon time series that is less susceptible to pulse shape distortion that can occur due to SPAD saturation and quenching. In some embodiments, all or parts of such filtering can be performed by processor 122.

In some embodiments, the photon time series output from processor 122 are sent to ranging system controller 104 for further processing, e.g., the data can be encoded by one or more encoders of ranging system controller 104 and then sent as data packets to user interface 150. Ranging system controller 104 can be realized in multiple ways including, e.g., by using a programmable logic device such an FPGA, as an ASIC or part of an ASIC, using a processor 130 with memory 132, and some combination of the above. Ranging system controller 104 can control light sensing module 108 by sending commands that include start and stop light detection and adjust photodetector parameters. Similarly, ranging system controller 104 can control light transmission module 106 by sending commands, or relaying commands that include, for example, controls to start and stop light emission and controls that can adjust other light-emitter parameters (e.g., pulse codes). In some embodiments, ranging system controller 104 has one or more wired interfaces or connectors for exchanging data with light sensing module

108 and with light transmission module 106. In other embodiments, ranging system controller 104 communicates with light sensing module 108 and light transmission module 106 over a wireless interconnect such as an optical communication link.

Solid state electronic scanning LIDAR system 100 can interact with a user interface 150, which can be any suitable user interface for enabling a user to interact with a computer system, e.g., a display, touch-screen, keyboard, mouse, and/or track pad for interfacing with a laptop, tablet, and/or handheld device computer system containing a CPU and memory. User interface 150 may be local to the object upon which solid state electronic scanning LIDAR system 100 is mounted but can also be a remotely operated system. For example, commands and data to/from solid state electronic scanning LIDAR system 100 can be routed through a cellular network (LTE, etc.), a personal area network (Bluetooth, Zigbee, etc.), a local area network (WiFi, IR, etc.), or a wide area network such as the Internet.

User interface 150 of hardware and software can present the imager data from the device to the user but can also allow a user to control solid state electronic scanning LIDAR system 100 with one or more commands. Example commands can include commands that activate or deactivate the imager system, specify photodetector exposure level, bias, sampling duration and other operational parameters (e.g., emitted pulse patterns and signal processing), specify light emitters parameters such as brightness. In addition, commands can allow the user to select the method for displaying results. The user interface can display imager system results which can include, e.g., a single frame snapshot image, a constantly updated video image, and/or a display of other light measurements for some or all pixels.

In some embodiments, for example where LIDAR system 100 is used for vehicle navigation, user interface 150 can be a part of a vehicle control unit that receives output from, and otherwise communicates with light ranging device 102 and/or user interface 150 through a network, such as one of the wired or wireless networks described above. One or more parameters associated with control of a vehicle can be modified by the vehicle control unit based on the received LIDAR data. For example, in a fully autonomous vehicle, LIDAR system 100 can provide a real time 3D image of the environment surrounding the car to aid in navigation in conjunction with GPS and other data. In other cases, LIDAR system 100 can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. When user interface 150 is implemented as part of a vehicle control unit, alerts can be provided to a driver or tracking of a proximity of an object can be tracked.

As mentioned herein, light ranging device 102 can be an electronic scanning LIDAR device that can capture an image of a scene by activating only a bank of emitters at a time and by reading out only a corresponding bank of photosensors simultaneous with the firing of the emitters. Different banks of emitters can be activated at different times with corresponding banks of photosensors being readout simultaneously so that all emitters can be eventually activated and all the photosensors in the sensor array can be readout through one emission cycle. As an example, an emitter array can emit light by activating one bank at a time and in sequential order from left to right for each emission cycle while the sensor array can be configured to readout the corresponding bank of photosensors in a corresponding sequence. Accordingly, embodiments of the invention can include one or more components to synchronize the emitting and sensing of light.

For example, light transmission module 106 can include an emitter controller 115 coupled to emitter array 114. Emitter controller 115 is configured to control the operation of emitter array 126 by, for example, selectively firing each bank of emitters according to a firing desired sequence. Emitter controller 115 can include a suitable processor, such as an ASIC, microcontroller, FPGA or other suitable processing element along with one or more driving components for operating emitter array 114 as discussed below. Similarly, light detection system 136 can include a sensor controller 125 coupled to sensor array 126 and configured to control the operation of sensor array 126. Sensor controller 125 can be any suitable component or group of components capable of selecting one or more photosensors to sense light, such as an ASIC, microcontroller, FPGA, or other suitable processor coupled to a selecting circuit, e.g., a multiplexer.

In some embodiments, sensor controller 125 and emitter controller 115 are synchronized such that the sequence of light emissions in emitter array 114 are synchronized with the sequence of reading out photosensors in sensor array 126. As an example, both sensor controller 125 and emitter controller 115 can be coupled to a clock 117 so that both controllers can operate based on the same timing scheme. Clock 117 can be an electrical component that generates a specific signal that oscillates between a high and low state at a certain speed for coordinating actions of digital circuits. Optionally, sensor controller 125 and emitter controller 115 can include their own clock circuits for coordinating their own actions. In such embodiments, sensor controller 125 and emitter controller 115 can be communicatively coupled together via a communication line 119 such that sensor controller 125 can synchronize its clock with emitter controller 115. That way, sensor controller 125 and emitter controller 115 can operate sensor array 126 and emitter array 114, respectively, in synchronization to effectuate image capture.

In some further embodiments, instead of, or in addition to, sensor controller 125 and emitter controller 115, ranging system controller 104 can be configured to synchronize the operation of light sensing module 108 and light transmission module 106 such that the sequence of light emissions by emitter array 114 are synchronized with the sequence of sensing light by sensor array 126. For instance, ranging system controller 104 can instruct emitter array 114 of light transmission module 106 to emit light by activating one bank at a time and in sequential order from left to right for each emission cycle, and correspondingly instruct sensor array 126 in light sensing module 108 to sense light one bank at a time and in the same sequential order. In such embodiments, ranging system controller 104 can have its own clock signal on which it bases its sequencing instructions to light sensing module 108 and light transmission module 106. It is to be appreciated that other forms of sequencing for light detection are envisioned herein and that such sequences are not limiting, as will be discussed further herein.

Figures 2A, 2B, 2C, 2D:
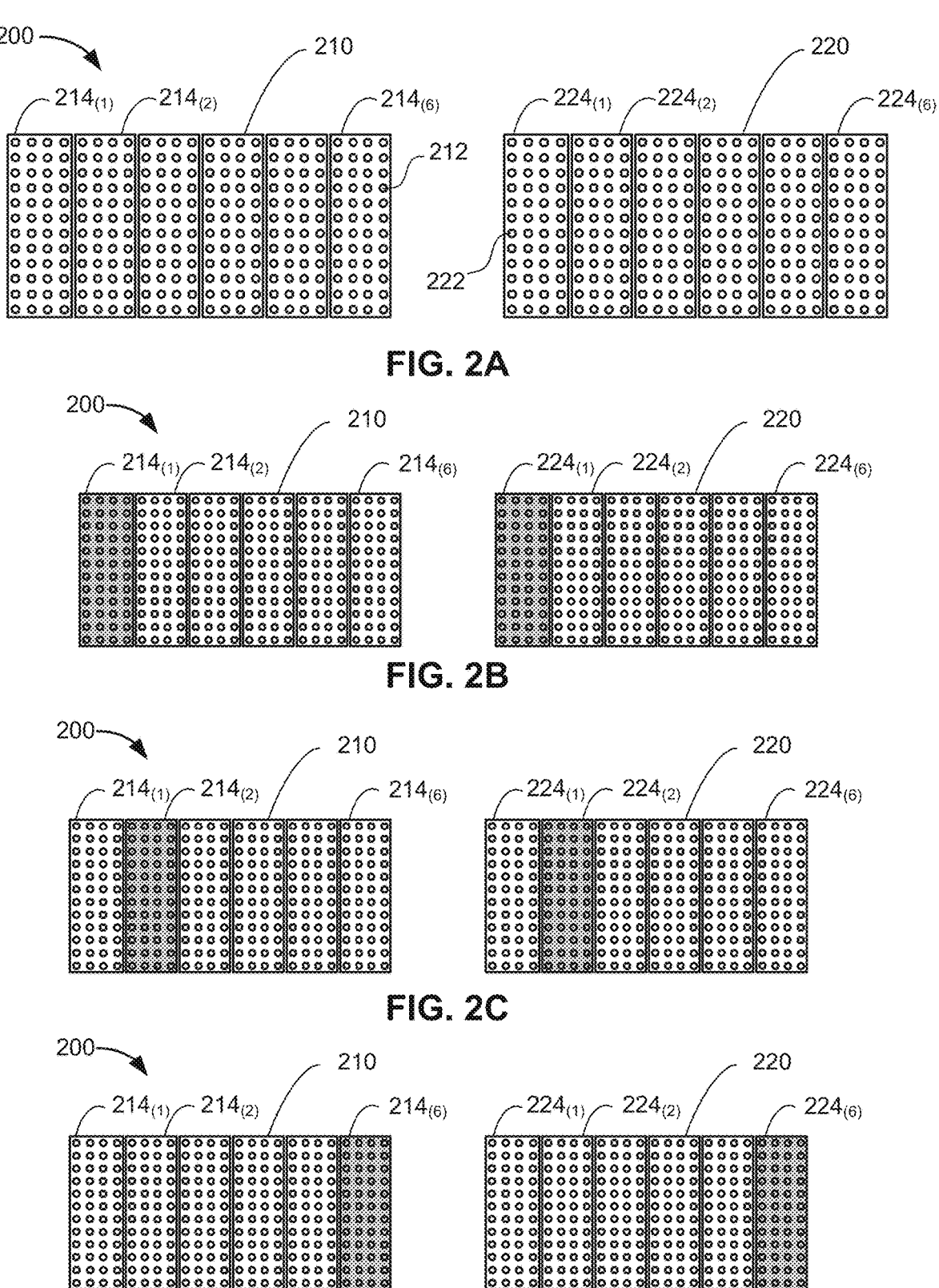
FIG. 2A is a simplified illustration of an emitter array and a sensor array for an exemplary solid state electronic scanning LIDAR system, according to some embodiments of the present invention.
FIGS. 2B-2D are simplified diagrams illustrating an exemplary firing sequence of a emitter array and sensor readout sequence of a sensor array, according to some embodiments of the present invention.

To illustrate one example of sequential firing of an emitter array and sensing of the sensing array reference is made to FIG. 2A, which is a simplified illustration of an emitter array 210 and sensor array 220 for an exemplary solid state electronic scanning LIDAR system 200 according to some embodiments of the present invention. Emitter array 210 can be a two-dimensional m×n array of emitters 212 having m number of columns and n number of rows and sensor array 222 can correspond with emitter array 210 such that each photosensor 222 is mapped to a respective emitter 212 in emitter array 210. Thus, sensor array 220 can be a corresponding two-dimensional m×n array of photosensors 222.

In some embodiments, emitter array 210 and sensor array 220 are generally large arrays that include more elements (i.e., more emitters and more photosensors) than emitter or sensor arrays typically employed in rotating LIDAR systems. The size, i.e., overall physical dimensions, of sensor array 220 (and thus the corresponding emitter array 210 for illuminating the field of view corresponding to sensor array 220 as well) along with the pitch of the photosensors within sensor array 220 can dictate the field of view and the resolution of images capable of being captured by sensor array 220. Larger sized arrays generally result in larger fields of view, and smaller pitch sizes generally result in captured images with higher resolution. In some embodiments, emitter array 210 and sensor array 220 are each formed from a single semiconductor die while in other embodiments, one or both of emitter array 210 and sensor array 220 can be formed of multiple chips mounted to a common substrate as discussed herein.

Emitter array 210 can be configured to be operated such that one or more sets of emitters (wherein each set is referred to herein as a "bank") can be fired simultaneously. For example, in the embodiments depicted in FIG. 2A, emitter array 210 is configured to includes six banks 214(1) . . . 214(6) where each bank includes four columns of emitters. Sensor array 220 can be configured with a similar geometry as emitter array 210 such that photosensors 222 are arranged in similarly arranged banks. Thus, in the embodiment depicted in FIG. 2A, sensor array 220 is also configured to include six banks 224(1) . . . 224(6) where each bank includes four columns of photosensors.

FIGS. 2B-2D are simplified diagrams illustrating a firing sequence of emitter array 210 and sensor readout sequence of sensor array 220 according to some embodiments of the present invention. As shown in FIG. 2B, a first stage of an image capturing sequence can start by firing emitter bank 214(1) of emitter array 210 and simultaneously reading out sensor bank 224(1) of sensor array 220. During this first stage, a pulse of light emitted from each individual emitter in emitter bank 214(1) is emitted into a field. The emitted light can then be reflected off of one or more objects in the field and be captured by a respective subset of photosensors within sensor bank 224(1) of sensor array 220. Next, during a second stage of the sequence, emitters from a second bank 214(2) of the emitter array can be activated to emit a pulse of light that can be read out by the sensors in sensor bank 224(2) in the sensor array as shown in FIG. 2C. The sequential firing of columns of emitters and simultaneous reading out of photosensors in a corresponding column of photosensors continues until the last bank of emitters 214(6) is activated concurrently with the last bank of photosensors 224(6) being read as shown in FIG. 2D. When one full cycle is complete (six stages of the image capturing sequence in the example depicted in FIGS. 2B-2D), every bank of emitter array 210 will have been activated and every corresponding bank of sensor array 220 will have been readout to detect photons emitted from the corresponding banks of emitter array 210. The cycle can then be continuously repeated while LIDAR system 200 is in operation.

Although FIG. 2A illustrates the emitter array and sensor arrays as divided into six different banks each having a specific number of emitters or photosensors, embodiments are not limited to such configurations. Other embodiments can have more or less than six banks and more or less emitters or photosensors per bank. For example, in some embodiments k banks of emitters and k banks of photosensors are employed where k is more than or fewer than the six banks depicted in FIG. 2A emitter array. As further examples, in some embodiments LIDAR sensor 200 can be divided into 16, 32, 64, 128, or more channels where each channel includes 1, 2, 4, 8 or more emitter columns, without departing from the spirit and scope of the present invention. Additionally, while FIG. 2A discusses banks in terms of columns of emitters and columns of photosensors, in other embodiments the emitter and photosensor arrays can be divided into banks having one or more rows of emitters and one or more rows of photosensors instead of columns such that one or more row of emitters are fired while simultaneously reading one or more corresponding rows of photosensors. In still other embodiments, a bank in emitter array 210 can include a subset of emitters that includes emitters in multiple columns and multiple rows (for example, emitters arranged in a square or rectangular pattern) and a bank in sensor array 220 can include a subset of photosensors arranged in a pattern corresponding to the subset of emitters.

Additionally, while FIGS. 2B-2D illustrate an image capturing sequence in which fired emitters are advanced one bank per stage, embodiments of the invention are not limited to any particular sequence. For example, in some embodiments the following sequence can be employed in LIDAR system having k banks: for stage one, a first bank of emitter array 210 is fired; for stage 2, bank (k/2+1) is fired; for stage 3, bank 2 is fired, for stage 4, bank (k/2+2) is fired, etc. until the kth stage when bank k is fired. Such an embodiment can be beneficial in minimizing cross-talk within the sensor array as adjacent sensor banks are not readout in successive stages. As another example, two or more adjacent banks of emitters can be fired concurrently while the corresponding two or more adjacent banks of sensors are read out. As an illustration where two banks are fired and read simultaneously, during a first stage of an image capturing sequence, banks 214(1) and 214(2) of emitter array 210 can be fired, during a second stage banks 214(3 and 214(4) can be fired, etc. These examples are just a few of the many different firing and readout sequences that are possible and other firing and readout sequences are possible in other embodiments.

Figure 3A:
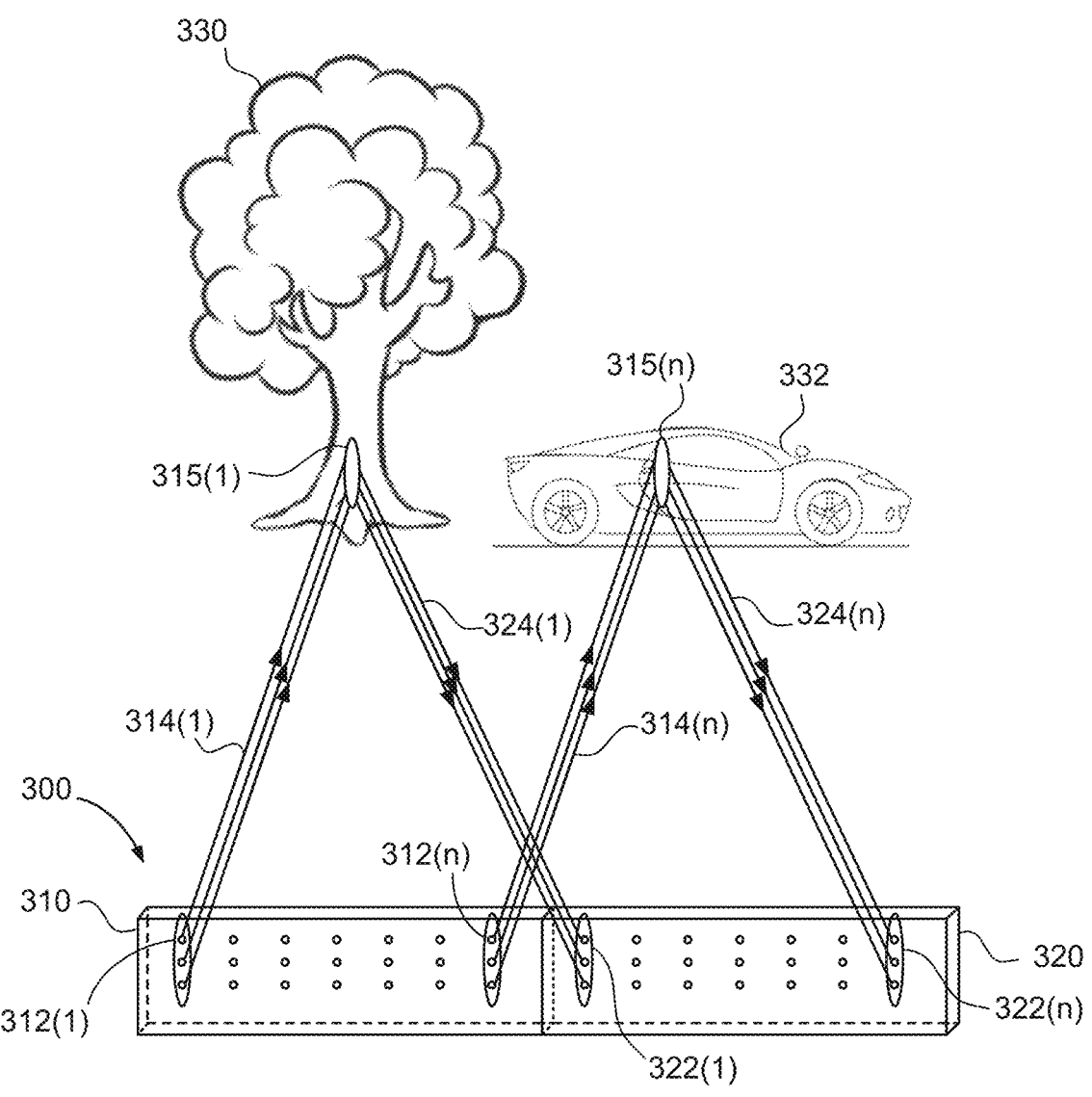
FIG. 3A illustrates an example of the light transmission and detection operation for an electronic scanning LIDAR system according to some embodiments of the present invention in a particular scenario.

FIG. 3A is an illustrative example of the light transmission and detection operation for an electronic scanning LIDAR system 300 according to some embodiments of the present invention in a particular scenario. Specifically, FIG. 3A shows solid state electronic scanning LIDAR system 300, which can be representative of LIDAR system 100 shown in FIG. 1, collecting three-dimensional distance data of a volume or scene that surrounds the system. FIG. 3A is an idealized drawing to highlight relationships between emitters and sensors, and thus other components are not shown.

Electronic scanning LIDAR system 300 includes an emitter array 310 (e.g., emitter array 114) and a sensor array 320 (e.g., sensor array 126). Emitter array 310 can be an array of light emitters, e.g. an array of vertical-cavity surface-emitting lasers (VCSELs) and the like, that includes banks of emitters 312(1) to 312(n). Sensor array 320 can be an array of photosensors that includes banks of sensors 322(1) to 322(n). The photosensors can be pixelated light sensors that employ, for each photosensor, a set of discrete photodetectors such as single photon avalanche diodes (SPADs) and the like. However, various embodiments can deploy other types of photon sensors.

For ease of illustration, emitter array 310 is depicted as having six banks of emitters where each bank includes a single column of three emitters and sensor array 320 is depicted as having a corresponding arrangement of photosensors. It is to be appreciated that banks of emitters 312(1) to 312(n) and banks of sensors 322(1) to 322(n) can be representative of portions of much larger banks of emitter array 310 and sensor array 320, respectively. Thus, while FIG. 3A only shows emitters and sensors for 21 distinct points for ease of illustration, it can be understood that other implementations can have significantly more emitters including banks that have multiple columns of emitters where each column includes many more than three individual emitters. That is, a denser sampling of points can be achieved by having a denser array of emitters and a corresponding denser array of photosensors.

Each emitter can be spaced apart by a pitch distance and can be configured to transmit light pulses into a different field of view from its neighboring emitters, thereby illuminating a respective field of view associated with only that emitter. For example, bank of emitters 312(1) emits illuminating beams 314(1) (each formed from one or more light pulses) into region 315(1) of the field of view and thus reflect off of a tree 330 in the field. Likewise, bank of emitters 312(n) emits illuminating beams 314(n) into region 315(n) of the field of view. It is to be appreciated that in the embodiment shown in FIG. 3A, emitter array 310 scans through its banks in sequential order from left to right. Thus, FIG. 3A shows the first instance of time where bank of emitters 312(1) is being activated and the last instance of time where the last bank, i.e., bank of emitters 312(n), is activated. The other banks can sequentially step from left to right between bank 312(1) to 312(n). While FIG. 3A shows an embodiment where emitter and sensor arrays 310 and 320 operate by vertically-oriented banks and in sequential order, embodiments are not limited to such configurations. In other embodiments, emitter and sensor arrays 310 and 320 can operate by vertically-oriented banks in a non-sequential order to minimize cross-talk, or by horizontally-oriented banks in a sequential or non-sequential order, or any other suitable order for emitting and receiving light, as will be discussed above and in detail further herein.

Each field of view that is illuminated by an emitter can be thought of as a pixel or spot in the corresponding 3D image that is produced from the ranging data. Thus, each emitter can be distinct from other emitters and be non-overlapping with other emitters such that there is a one-to-one mapping between the set of emitters and the set of non-overlapping fields of view. In some embodiments, emitter array 310 and sensor array 320 are each solid state devices that can be very small and very close to each other. For instance, the size of an emitter or sensor array, according to the present embodiments, could range from a few millimeters to a few centimeters. As such, the dimensions of the two arrays and their separation distance, which can be less than a couple of centimeters, are negligible compared with the distances to the objects in the scene. When this arrangement of emitter and sensor arrays is paired with respective bulk optics that can collimate the light emitted by the emitter array and focus the reflected light into the sensor array, the sensor array and emitter array can have significantly similar fields of view beyond a threshold distance such that each emitter and corresponding sensor looks at essentially the same spot in the field. This concept can be better understood with reference to FIG. 3B.

Figure 3B:
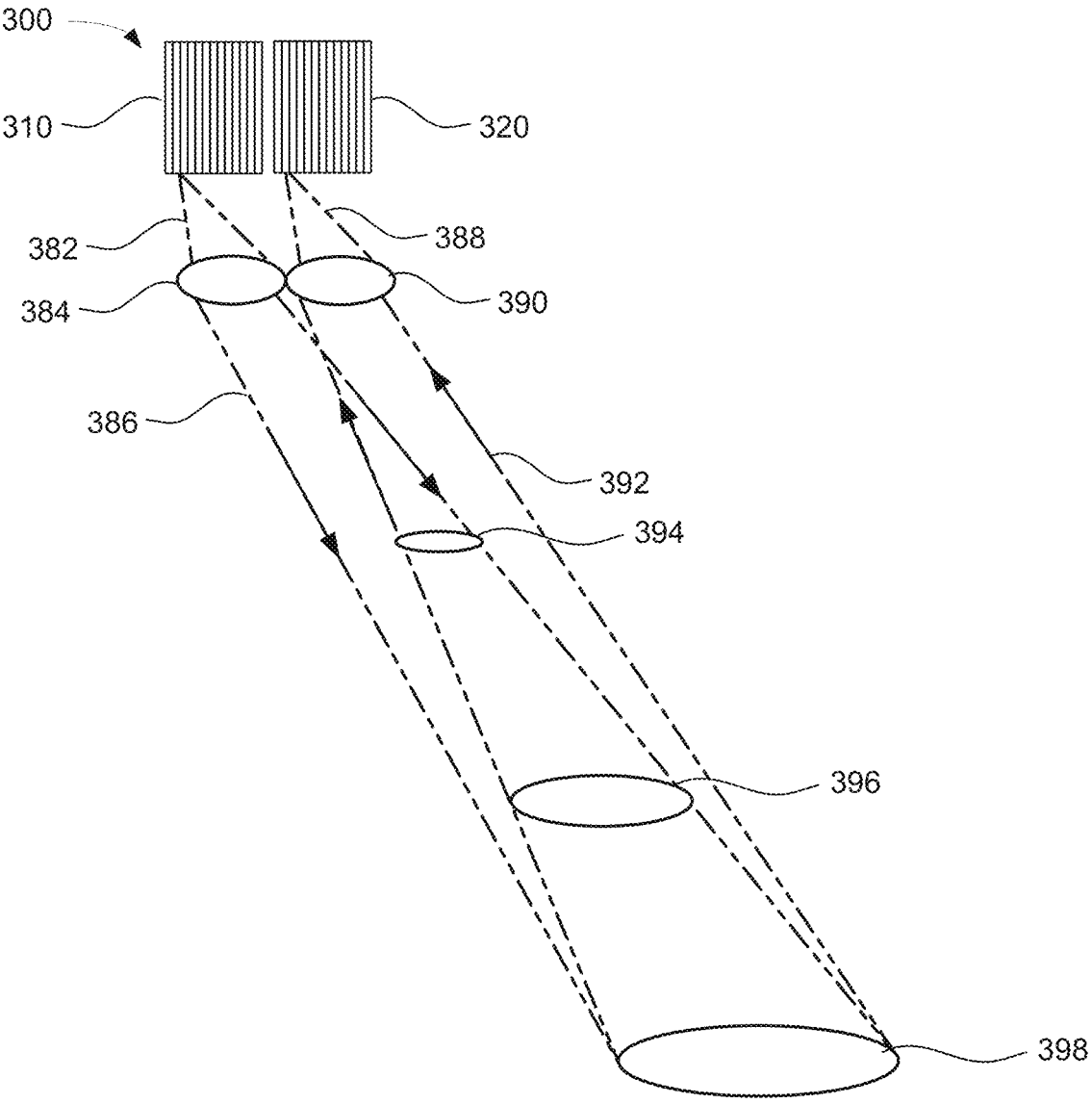
FIG. 3B is a simplified illustration of the overlapping field of views for an emitter array and sensor array according to some embodiments of the invention.

FIG. 3B is a simplified illustration of the overlapping field of views for emitter array 310 and sensor array 320, according to some embodiments of the invention. Each emitter in emitter array 310 can emit a pulse of light that is shown in FIG. 3B as a cone 382 that gets collimated through a bulk transmitter optic 384 and outputted into the field as emitted light 386. Emitted light 386 can then reflect off of one or more objects in the field and propagate back toward sensor array 320 as reflected light 392 that first propagates through bulk receiver optic 390, which focuses reflected light 392 back down into a focal point as a cone of pulsed light 388 and then onto a corresponding photosensor within sensor array 320. As can be understood with reference to FIG. 3B, the distance between bulk transmitter and receiver optics 184 and 390, which can range, for example between 1-3 cm, is relatively small compared with the distance to the scene. Thus, as the scene gets farther, the field of view for the emitter array increasingly overlaps with the field of view for the sensor array. For instance, as shown in FIG. 3B, overlapping regions 394, 396, and 398 of the fields of view for emitter array 310 and sensor array 320 get larger as the distance to the scene increases. Thus, at distances near the end of the scene, e.g., objects in the field, the field of view of emitter array 310 can substantially overlap the field of view of sensor array 320. Accordingly, each corresponding emitter and sensor can observe essentially the same point in the scene even though the bulk receiver and transmitter optics are separated by one or more centimeters. That is, each illuminating beam projected from bulk transmitter optic 184 into the field ahead of the system can be substantially the same size and geometry as the field of view of a corresponding photosensor (or a micro-optic receiver channel for the corresponding photosensor) at a distance from the system. In some embodiments, emitter array 310 can selectively project illuminating beams into the field ahead of system 300 according to an illumination pattern that substantially matches, in size and geometry across a range of distances from system 300, the fields of view of the input channels. By having substantially overlapping field of views between the emitter array and sensor array, solid state electronic scanning LIDAR system 300 can achieve a high signal-to-noise ratio (SNR).

In some embodiments, the transmitter array and sensor array have matching geometries and the bulk optics of the emitter array are substantially identical to the bulk optics of the sensor array. In other embodiments the dimensions and the bulk optics of sensor array 320 may not be identical to those of emitter array 310, however, they can be chosen such that corresponding banks of emitter array 310 and sensor array 320 have significantly the same field of view. For example, the size of sensor array 320 could be larger than that of emitter array 310. This would imply that bulk receiver optics 390 of sensor array 320 should be different than bulk transmitter optics 184 of emitter array 310, and the two bulk optics should be carefully chosen such that the field of view of corresponding banks in the two arrays are significantly the same. For instance, a similar bulk optics with lens elements that are twice as large as those of emitter array 310 could be used. The resulting bulk receiver optics would have a focal length twice as long as the focal length of the bulk transmitter optics. In this case, sensor array 320 should be twice as tall and twice as wide as emitter array 310 with receiving aperture diameters twice that of the emitting diameters, ensuring that the angular field of view for every photosensor and emitter match.

To ensure that the corresponding banks of emitter array 310 and sensor array 320 see the same field of view, an alignment process of LIDAR system 300 can be performed before field use, e.g., by the manufacturer. Design features of some embodiments of the invention (e.g, having a single semiconductor die or multichip module for the emitter array and a single semiconductor die of multichip module for the sensor array) allows this alignment to be performed only once by the manufacturer, thereby easing the way at which LIDAR system 300 is manufactured and maintained after manufacturing. During the alignment of the optics, one can measure the field of view of every pixel and every emitter to ensure they are significantly identical. The alignment process can account for lens properties such as aberration, distortion, and focal length as well as adjusting position and orientation of lens elements with respect to external components.

Because the fields of view of the emitters are overlapped with the fields of view of their respective sensors, each photosensor ideally can detect the reflected illumination beam that originates from its corresponding emitter with ideally no cross-talk, i.e., no reflected light from other illuminating beams is detected. For example, with reference back to FIG. 3A, bank of emitters 312(1) emits illuminating beams 314(1) into region 315(1) of the field of view and some of the illuminating beams reflect from object 330, i.e., a tree. Ideally, a reflected portion of light 324(1) is detected by bank of photosensors 322(1) only. Thus, bank of emitters 312(1) and bank of photosensors 322(1) share the same field of view. Likewise, bank of emitters 312(n) and bank of photosensors 322(n) can also share the same field of view such that reflected portion of light 324(n) is only detected by photosensors 322(n). For instance, during the last iteration of the emitting cycle, bank of emitters 312(n) emits illuminating beams 314(n) into region 315(n) of the field of view and some of the illuminating beam reflects from object 332, i.e., a car parked next to object 330. In one cycle, solid state electronic scanning LIDAR system 350 in FIG. 3A can capture and generate an image representing the scene including portions of tree 330 and car 332. Additional cycles can further capture other regions of the scene, especially if system 300 is moving, such as when system 300 is mounted on a car, as will be discussed further herein with respect to FIGS. 12 and 13. While the corresponding emitters and sensors are shown in FIG. 3A as being in the same relative locations in their respective array, any emitter can be paired with any sensor depending on the design of the optics used in the system.

During a ranging measurement, the reflected light from the different fields of view distributed around the volume surrounding the LIDAR system is collected by the various sensors and processed, resulting in range information for any objects in each respective field of view. As described above, a time-of-flight technique can be used in which the light emitters emit precisely timed pulses, and the reflections of the pulses are detected by the respective sensors after some elapsed time. The elapsed time between emission and detection and the known speed of light is then used to compute the distance to the reflecting surface. In some embodiments, additional information can be obtained by the sensor to determine other properties of the reflecting surface in addition to the range. For example, the Doppler shift of a pulse can be measured by the sensor and used to compute the relative velocity between the sensor and the reflecting surface. The pulse strength can be used to estimate the target reflectivity, and the pulse shape can be used to determine if the target is a hard or diffuse material.

According to some embodiments, LIDAR system 300 can transmit multiple pulses of light. In some embodiments, each coded-pulse has an embedded positive-valued pulse-code formed by the light intensity. The system can determine the temporal position and/or amplitude of optical pulses in the presence of background light by creating an intensity histogram of detected, reflected light at different time bins. For each time bin, the system adds a weighted value to the intensity histogram that depends on the intensity of detected light. The weighted values can be positive or negative and have varying magnitudes.

By selecting different combinations of positive-valued pulse-codes and applying different weights, the system can detect positive-valued and negative-valued codes suitable for standard digital signal processing algorithms. This approach gives a high signal-to-noise ratio while maintaining a low uncertainty in the measured temporal position of the reflected light pulses.

Figure 4A:
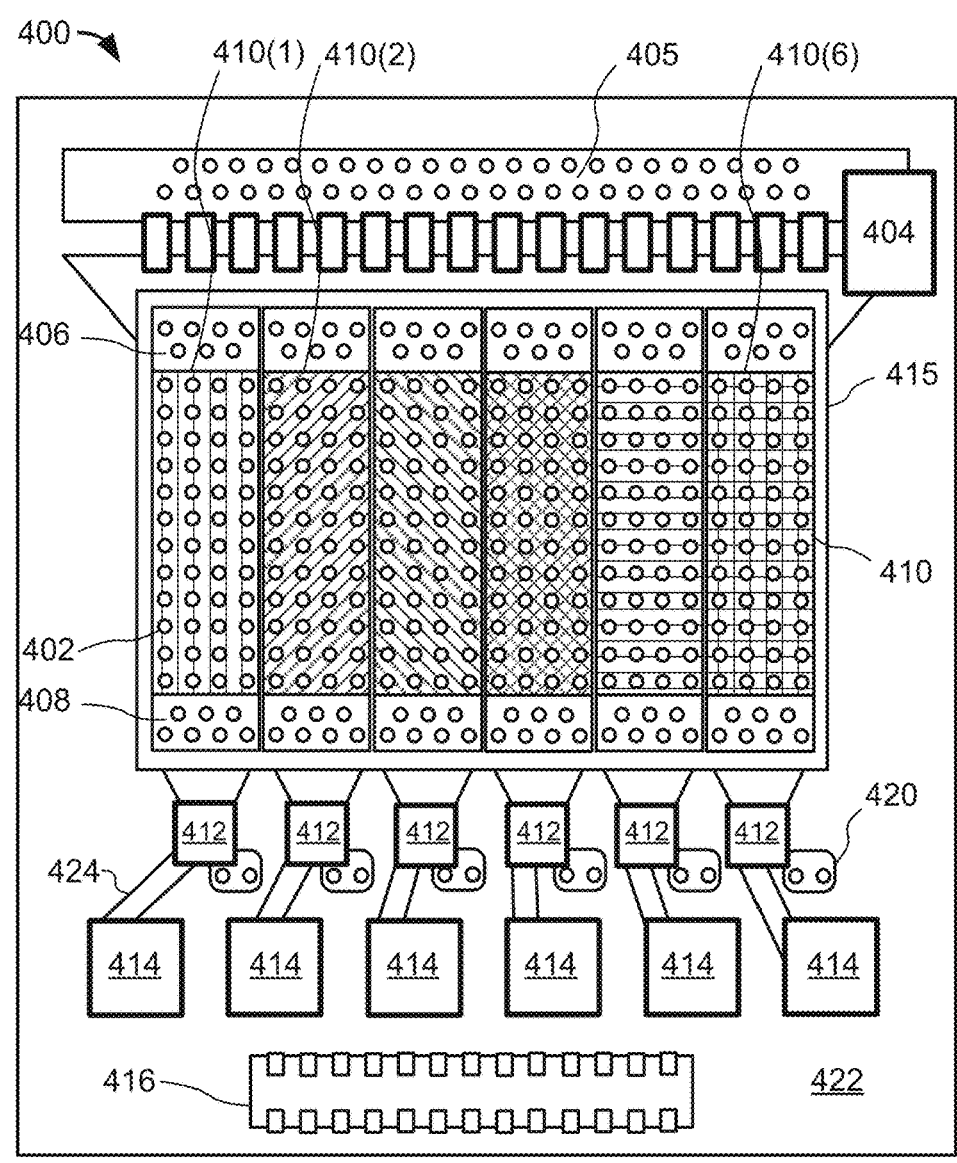
FIG. 4A is a simplified top-down, block diagram of an exemplary electronically scanning laser array that can be incorporated into a solid-state LIDAR system.

FIG. 4A is a simplified top-view, block diagram of an electronically scanning laser array 400 that includes an emitter array 410 of m×n emitters along with various capacitors, switches and control chips for operating the laser array. Emitter array 410 is divided into six separately driven banks 410(1) . . . 410(6) of emitters with each of the emitter banks includes an equal number of individual light emitters 402 (e.g., VSCELs) arranged in one or two-dimensional arrays (shown as 4×n arrays in FIG. 4A) that generates an illumination pattern. Emitter array 410 can be representative of, for example, emitter array 210 discussed above with respect to FIGS. 2A-2D and can be paired in a LIDAR system with a photosensor array, such as photosensor array 220 discussed above, that includes six banks of photosensors with a sensing pattern having a geometry matching that of the illumination pattern.

In some embodiments, emitter array 410 can be formed on a single monolithic structure (e.g., a ceramic submount 415 or other appropriate substrate) where each bank is a separate semiconductor die. In other embodiments, the VCSEL array can be formed on a large single chip in which cathodes of different banks in the VCSEL array are electrically isolated from each other enabling the banks to be individually controlled. Each bank can be driven by separate driver circuitry such that there are k driver circuits for an emitter array having k banks. In the embodiment depicted in FIG. 4, each driver circuit includes an FET driver 412 and a gate driver 414 coupled to the low side of emitter array 410. Each FET driver 412 is a high current switch that can be turned ON by its respective gate driver 414 and each driver circuit 412, 414 is coupled to its respective bank and can fire all the individual emitters 402 in its bank simultaneously. The drivers 412, 414 can be activated according to a predetermined sequence (e.g., as described above with respect to FIGS. 2B-2D) by control circuitry such that each bank is fired during an image capture period one time while corresponding banks of photosensors are readout until the entire emitter array is fired and the entire photosensor array is readout. In this manner electronically scanning laser array 400 can use significantly less power (for a given size array and given brightness) than a flash LIDAR system that activates all emitters at once.

In some embodiments each bank 410(1) . . . 410(6) can be constructed as a separate discrete semiconductor die mounted on a ceramic or other suitable substrate 405 and electrically isolated from each other. Each die (i.e., bank in this embodiment) is individually addressable for emitting light during operation of electronic scanning LIDAR systems. Additionally, in various embodiments, each gate and FET driver can be a separate, individual component; multiple FET drivers can be combined together on a single chip; multiple gate drivers can be combined together on a single chip; and/or one or more gate drivers and FET drivers can be combined together onto a single chip.

In order to generate light, current is driven through emitters 402 in emitter array 410. Thus, emitter banks 410(1) . . . 410(6) can be coupled to a capacitor bank 404 that includes one or more capacitors configured to discharge current through the emitter array. Each emitter bank can include a respective contact array or via array 406 for coupling with capacitor bank 404. Contact arrays 406 can be part of the semiconductor dies upon which respective emitter banks 410(1) . . . 410(6) are constructed. In some embodiments, contact arrays 406 are positioned between capacitor bank 404 and light emitters 402 within their respective emitter banks. Before activation of one or more emitters in emitter array 410, one or more capacitors in capacitor bank 404 can be charged so that during activation of the one or more emitters in emitter array 410, the one or more charged capacitors can be discharged to drive a substantial amount of current (e.g., between 10 to 100 amps or more in some embodiments; between 50 to 100 amps in some embodiments and between 50 to 200 amps in some embodiments) through each bank to emit narrowband light. The capacitors in capacitor bank 404 can be coupled to a power source (not shown) for charging the capacitors. The power source can be coupled to capacitor bank 404 via an array of electrical connections 405, where each electrical connection is a via coupled to a trace (not shown) routed to the power source. The electrical connections and traces can be part of, or formed on, an interconnection structure 422 (e.g., a printed circuit board "PCB"), upon which capacitor bank 404 and emitter array 410 are mounted. The traces, capacitors, emitters and drivers can be positioned so as to minimize the loop inductance of the discharge path of the circuit to minimize rise times for the drive current in the circuit.

In some embodiments, electronically scanning laser array 400 can be implemented as a multichip module in which electrical inputs and outputs to the system (e.g., timing signals to drivers 412 and 414) can be transmitted to and from electronically scanning laser array 400 by an electrical connector 416 (e.g., a board-to-board connector). Electrical connector 416 can be coupled to drivers 412 and 414 to enable the transfer of control signals to the drivers. Drivers 412 and/or 414 can be semiconductor devices (e.g., field effect transistors or "FETs") that manage the flow of current through emitter array 410. Thus, drivers 412 and 414, in response to control signals, can dictate the order in which emitter array 410 emits light or enable a processing system (not shown) to do so through connector 416. For instance, drivers 412 and 414 can activate emitter array 410 by emitter bank and in sequential order from left to right, or in a different sequence as described above with respect to FIGS. 2B-2D. Accordingly, in one emission cycle, drivers 412 and 414 can operate emitter array 410 by activating emitters 402 in emitter bank 410(1) during a first instance of time, activating emitters 402 in emitter bank 410(2) during a second instance of time, and so on and so forth until the last emitter bank 410(6) is activated during a last instance of the cycle, where the emitting of light during the first through the last instances of time together form a single emission cycle. In some embodiments, drivers 412 and 414 are coupled together via electrical connections 424, which can be a traces plated on interconnection structure 422. That way drivers 412 and 414 can communicate with one another to control the operation of emitter array 410.

As shown in FIG. 4A, each emitter bank 410(1) . . . 410(6) can include a respective contact array 408 for coupling the bank with driver 412. Like contact arrays 406 contact arrays 408 can be part of the semiconductor dies upon which respective emitter banks are fabricated. In some embodiments, contact arrays 408 are positioned between drivers 412 and light emitters 402 within their respective emitter banks. Furthermore, drivers 412 can each be coupled to a respective set of electrical connections 420, that can be a part of, or formed on, interconnection structure 422 upon which drivers 412 and 414 are mounted. Electrical connections 420 can couple drivers 412 to appropriate signal paths and/or components (not shown) on interconnection structure 422.

While electronically scanning laser array 400 is shown as including six separately addressable banks, each of which can said to be part of an individual channel, embodiments of the invention are not limited to a particular number of channels. The design shown in FIG. 4A has practical limitations, however, in the number channels that can be included while still driving sufficiently high current levels through the emitter array at sufficiently fast speeds to satisfy certain requirements of some commercial LIDAR applications. For example, in order to achieve a certain brightness of each emitter in the emitter array 410 a relatively high level of current needs to be supplied by the drivers 412 and 414 through the laser array. The amount of current that can be driven through a given channel depends in part on the capacity of the capacitors in capacitor bank 404, the number of emitters in the channel and the size of drivers 412 and 414 for the channel. In order to drive a desirably high level of current through a given channel, each driver 412, 414 needs to be of a sufficient size to handle the desired current level. In some embodiments where a large number of channels are desired with each channel supporting a relatively high current level in the tens of amps or more, the layout of the drivers 412, 414 can be a limiting factor in the performance of the emitter array.

Figure 4B:
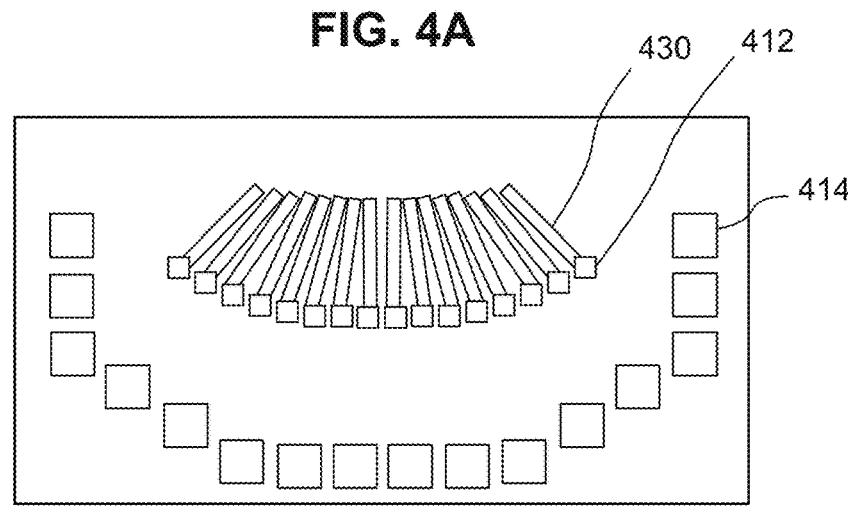
FIG. 4B is a simplified diagram that is intended to be a proper scale illustration depicting an arrangement of drivers that support a sixteen (16) channel emitter array in accordance with the exemplary system depicted in FIG. 4A.

As an example, FIG. 4B depicts an arrangement of drivers 412, 414 that support a sixteen (16) independent channel emitter array. FIG. 4B is intended to be a proper scale illustration of 0.9 mm FET drivers 412 arranged around and connected to a 12.8×6.4 mm emitter array (not shown in FIG. 4B) by electrical connections 430. While not shown in FIG. 4B, capacitors (e.g., 0402 capacitors) can be connected to the emitter array on the high side. As depicted in FIG. 4B, with sixteen gate drivers 414 to support the sixteen channels, the gate drivers 414 require more space than is practical and would require signal paths that connect the gate drivers to the FET drivers that are undesirably long and thus have inductance levels that can adversely impact timing of the circuit.

Figure 5:
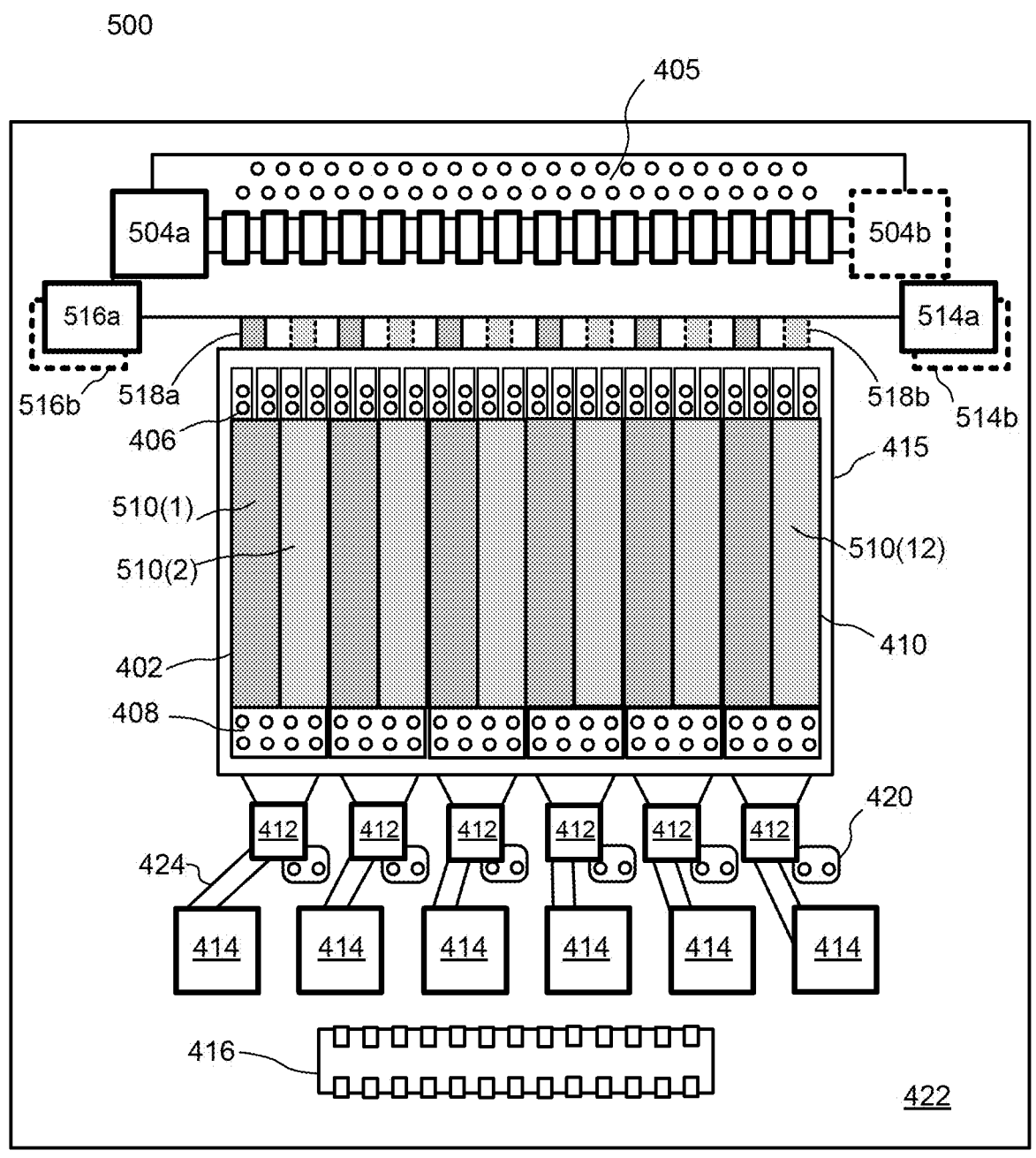
FIG. 5 is a simplified top-down, block diagram of an electronically scanning laser array according to some embodiments of the present invention that can be incorporated into a solid-state LIDAR system.

Some embodiments of the invention solve this potential problem by including a pair of high-side switches that connect the emitter array to the capacitor bank, in addition to low-side switches. One example of such an embodiment is shown in FIG. 5, which is a simplified top-down, block diagram of an electronically scanning laser array 500 according to some embodiments of the invention. As shown in FIG. 5, electronically scanning laser array 500 includes two high-side switches 514a, 514b that work in concert with six low-side switches 412 to scan through twelve independent emitter banks 510(1) . . . 510(12), each of which can include multiple columns of emitters. In some embodiments, laser array 500 also includes two FETs 516a, 516b to discharge the capacitor banks at the end of a firing cycle as discussed below.

The high-side switches can be coupled between a voltage source and a respective capacitor bank 504a, 504b that includes one or more capacitors configured to drive the emitter array. Capacitors 504a, 504b are, in turn, connected to the emitter banks by interconnects 518a, 518b. In some embodiments capacitor banks 504a, 504b, along with the associated switches and interconnects for each bank, can be positioned on opposite sides (e.g., top and bottom sides) of a printed circuit board. While FIG. 5 is intended to be a block diagram of electronically scanning laser array 500, capacitor bank 504b, switch 514b, switch 516b and interconnects 518b are shown in dashed lines to indicate the position on opposite sides of a PCB from components 504a, 514a, 516a and 518a in such embodiments.

The high-side switches can be selectively activated to connect the capacitor banks to the voltage source to charge the capacitors. For example, switch 514a can couple capacitor bank 504a to the voltage source while switch 514b can couple capacitor bank 504b to the voltage source. The low-side switches can be selectively activated to discharge the capacitors through the emitter array to selectively fire banks of emitters in the array. The capacitors can be charged at significantly lower current levels than the current levels used to drive the emitter array enabling the high-side switches to be smaller (i.e., take up less real estate) than the low-side switches that are required to handle higher current levels.

The above-described arrangement of high-side and low-side switches allows for an increase in the total number of independent drive circuits that can be implemented given the size constraints of the low-side switches as discussed with respect to FIG. 4B. Thus, while electronically scanning laser array 500 has the same number of emitters (not shown in FIG. 5 but equivalent to emitters 402) as laser array 400, the emitters in array 500 are arranged in twelve independently controlled banks, instead of the six banks for array 400. In some embodiments, diodes shown as diodes 610(1) to 610(12) in the circuit diagram of FIG. 6 discussed below) can be placed in series with each emitter bank. The diodes can be sufficiently sized to withstand high reverse voltages and can thus prevent current flow in the opposite direction that could damage emitters if multiple emitter banks share a cathode but have different anode voltages.

Figures 6, 7A, 7B, 7C:
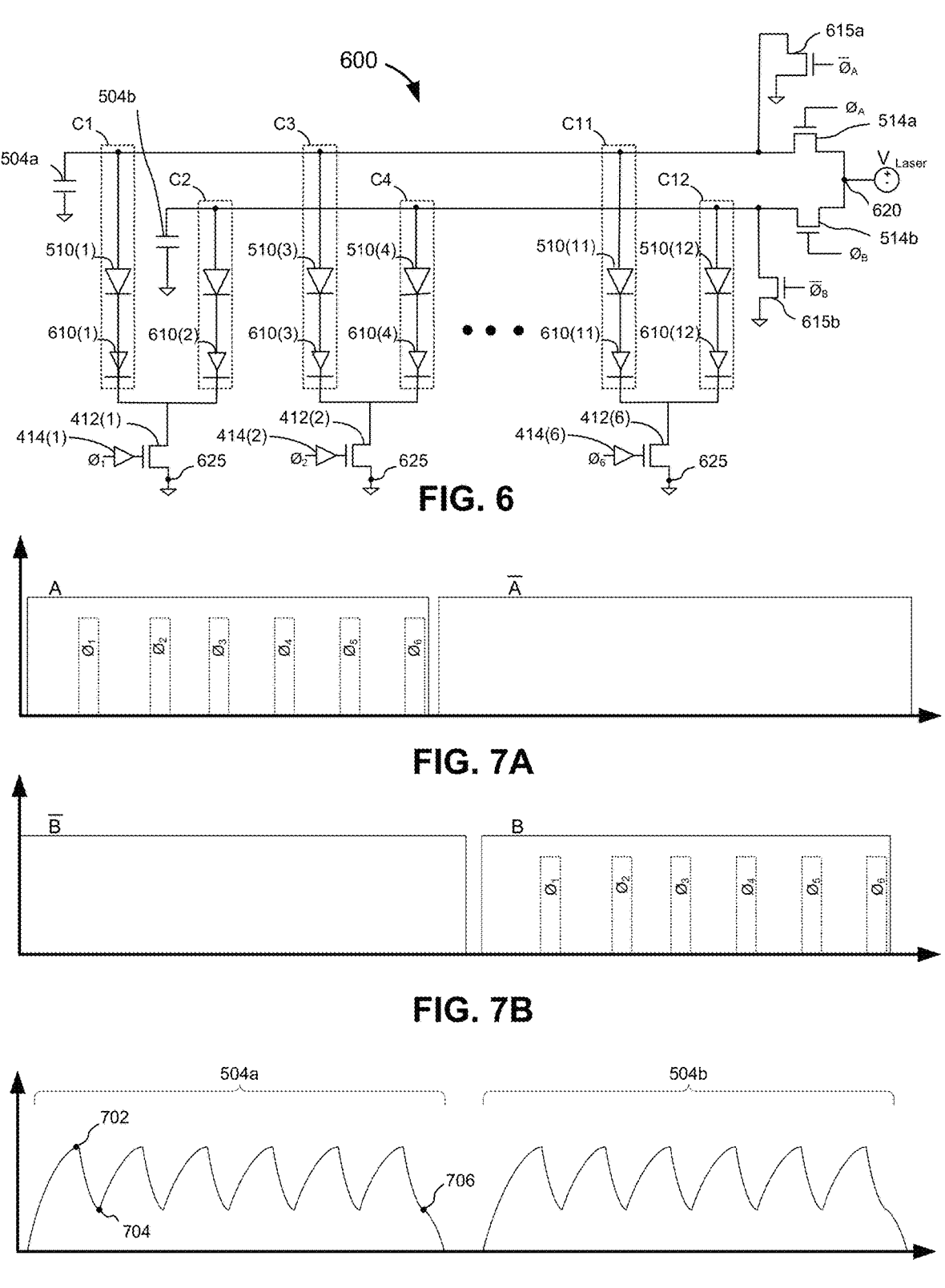
FIG. 6 is a schematic diagram of an electronic circuit representative of electronically scanning laser array 500 shown in FIG. 5.
FIGS. 7A-7C are timing diagrams depicting the operation of electronic circuit 600 shown in FIG. 6 in accordance with some embodiments of the invention.

FIG. 6 is a schematic diagram of an electronic circuit 600 representative of electronically scanning laser array 500. As shown in FIG. 6, circuit 600 includes 12 separate and independently operable channels C1 to C12 of which only channels C1 . . . C4 and C11 . . . C12 are shown for ease of illustration. Each of channels C5, C7 and C9 that are not depicted in FIG. 6 can be represented by substantially identical circuitry as shown with respect to channels C1, C3 and C11, and each of channels C6, C8 and C10 that are also not depicted can be represented by substantially identical circuitry as shown with respect to channels C2, C4 and C12.

Each of channels C1 . . . C12 includes an emitter bank (i.e., one of emitter banks 510(1) to 510(12)) and a diode (i.e., one of diodes 610(1) to 610(12)) and is coupled between one of the high-side switches 514a or 514b and one of the low-side switches 412(1) to 412(6). Each channel is also coupled at its high side to one of capacitors 504(a) or 504(b) and each of the two high-side switches are coupled between one of the capacitors and a power source that supplies a voltage ($V_{Laser}$) to a node (e.g., terminal 620) that charges the capacitors to drive the emitter banks.

As discussed above with respect to FIGS. 4A and 5, gate drivers 414(1) . . . 414(6) (shown in FIG. 5 as gate drivers 414) turn the low-side switches 412(1) . . . 412(6) ON and OFF in response to control signals $Ø_1$ to $Ø_6$, which can be generated by a processor, microcontroller or other circuitry (e.g., emitter controller 115). High-side switches 514a, 514b can be said to divide the emitter array and channels into two separate circuits—an A side (or A rail) and a B side (or B rail). Thus, channels C1 . . . C12 can be represented by A rail channels A1 . . . A6 and by B rail channels B1 . . . B6 where channel C1=channel A1, channel C2=channel B1, channel C3=channel A2, channel C4=channel B2, etc. and channel C11=channel A6 and channel C12=channel B6.

Switches 514(a) and 514(b) can be low power switches that handle considerably less current than, and are thus considerably smaller than, high power switches 412(1) . . . 412(6). Thus, the embodiment of the invention depicted in FIGS. 5 and 6 enables twelve independently operable channels using two low current high-side switches and six high current low-side switches that take up considerably less real estate than twelve high current low-side switches that would otherwise be required.

In operation, switches 514a and 514b control the charging of capacitors 504a and 504b, respectively. Once charged, the capacitors can be discharged by switches 412(1) . . . 412(6) to drive current through the emitter banks. To better understand the operation of circuit 600, reference is made to FIGS. 7A-7C, which are timing diagrams depicting the operation of circuit 600 according to an embodiment of the invention in which capacitors 504a and 504b are relatively large (e.g., in the microfarad range) and the firing sequence of channels C1 to C12 for each emission cycle is: A1, A2, A3, A4, A5, A6 (all of which are connected to the A rail) followed by B1, B2, B3, B4, B5, B6 (all of which are connected to the B rail). In each of FIGS. 7A-7C, voltage is represented on the Y-axis and time, starting at the same time $T_0$ for each, is represented on the X-axis. Specifically, FIG. 7A depicts the timing sequence of circuitry associated with charging and discharging capacitor 504a; FIG. 7B depicts the timing sequence of circuitry associated with charging and discharging capacitor 504b; and FIG. 7C depicts a voltage level of the capacitors 504a and 504b in response to the timing signals depicted in FIGS. 7A and 7B. While embodiments of the invention are not limited to specific voltage levels, and thus voltages are not shown in FIG. 7C, some embodiments store between 20-50 volts in the capacitors when firing each emitter bank.

Embodiments of the invention can initiate the above-described firing sequence by setting the $Ø_A$ signal high closing low current FET 514a to initiating the charging of capacitor 504a. Once the capacitor is fully charged (702 in FIG. 7A), each of high-current switches 412(1) . . . 412(6) are activated in sequence by control signals $Ø_1$ . . . $Ø_6$ to drive current through and fire the emitters associated with channels C1, C3, C5, C7, C9 and C11. For example, when control signal $Ø_1$ is pulsed high, capacitor 504a is discharged through emitter bank 510(1) firing each emitter in channel C1. The length of the pulse $Ø_1$ determines the length of time that emitter bank 510(1) is fired. Since capacitor 504a is rather large and pulse $Ø_1$ rather short, capacitor 504a is not fully discharged after the pulse and instead retains an amount of charge shown by voltage level 704. The same sequence can then be repeated for channels C3, C5, C7, C9 and C11.

After channel C11 is fired, the $\overline{Ø}_A$ line can be pulsed high (or set high for the duration of the charging and discharging sequence of capacitor 504b as depicted in FIGS. 7A and 7B) at time 706 to activate switch 615a and fully discharge capacitor 504a through ground so that no residual charge is left on capacitor 504a that might otherwise fire the A rail channels A1, A2, A3, A4, A5 and A6 when the B rail is activated.

After all the A rail channels have been fired, the $Ø_B$ signal is set high closing low current FET 514b to initiating the charging of capacitor 504b. Once capacitor 504b is fully charged, each of high-current switches 412(1) . . . 412(6) is activated again in sequence by control signals $Ø_1$ . . . $Ø_6$ to drive current through and fire the emitters in B rail channels B1, B2, B3, B4, B5 and B6 as described above with respect to the A rail. At the end of that sequence, the $\overline{Ø}_B$ line can be set high to activate switch 615b and fully discharge capacitor 504b through ground so that no residual charge is left on capacitor 504b that might otherwise fire the B rail channels B1, B2, B3, B4, B5 and B6 when the A rail is activated during the next emission cycle.

Some embodiments of the invention can employ smaller capacitors (e.g., in the picofarad range) as capacitors 504a and 504b. In such embodiments, the capacitors can be fully discharged after each channel is fired and the length of time that the emitters in a given channel are fired will be dependent on the discharge time of the capacitors instead of the pulse width of signals $Ø_1$ . . . $Ø_6$. When capacitors 504a, 504b are fully discharged after a channel is fired, such embodiments enable additional flexibility in the timing sequence of the channels as there is not necessarily a benefit in firing all the channels coupled to one of rails A or B prior to firing the channels in the other rail. For example, a firing sequence of the channels sequentially from left to right (A1, B1, A2, B2, . . . A6, B6) is possible as are other arbitrary firing sequences in which a subset of banks from the first rail are fired followed by a subset of banks from the second rail (e.g., A1, A2, B1, B2, A3, A4, B3, B4, A5, A6, B5, B6). Also, in such embodiments, switches 615a, 615b are optional since capacitors 504a, 504b are fully discharged by the emitter array after each firing event.

In some embodiments, current is driven through the channels using paths that minimize inductance. Thus, it can be advantageous to alternate the channels such that pairs of channels (in an embodiment with two high-side switches) are driven by the same low-side switch. For example, as shown in FIG. 6 channels C1 and C2 are each driven by low-side switch 412(1), which channels C3 and C4 are each driven by low-side switch 412(2). Such an arrangement can ensure that the current path through each pair of channels is similar (essentially parallel to each other) and thus the two channels in the pair (and all the channels in the system) can have similar inductances.

While electronically scanning laser array 500 (and circuit 600) are shown in FIGS. 5 and 6 as including twelve channels using two high-side switches and six low-side switches, in other embodiments array 500 can include k independently controlled channels using two high-side switches and k/2 low-side switches. Still other embodiments can include 1 high-side switches and k/1 low-side switches to implement k independently controlled channels. For example, one embodiment of the invention can include three high-side switches (and thus three rails A, B and C), each of which can be coupled to a dedicated capacitor 504, and six low-side switches enabling 18 independently controlled channels. Another embodiment can include four high-side switches and eight low-side switches enabling 32 independently controlled channels.

Figures 8, 9:
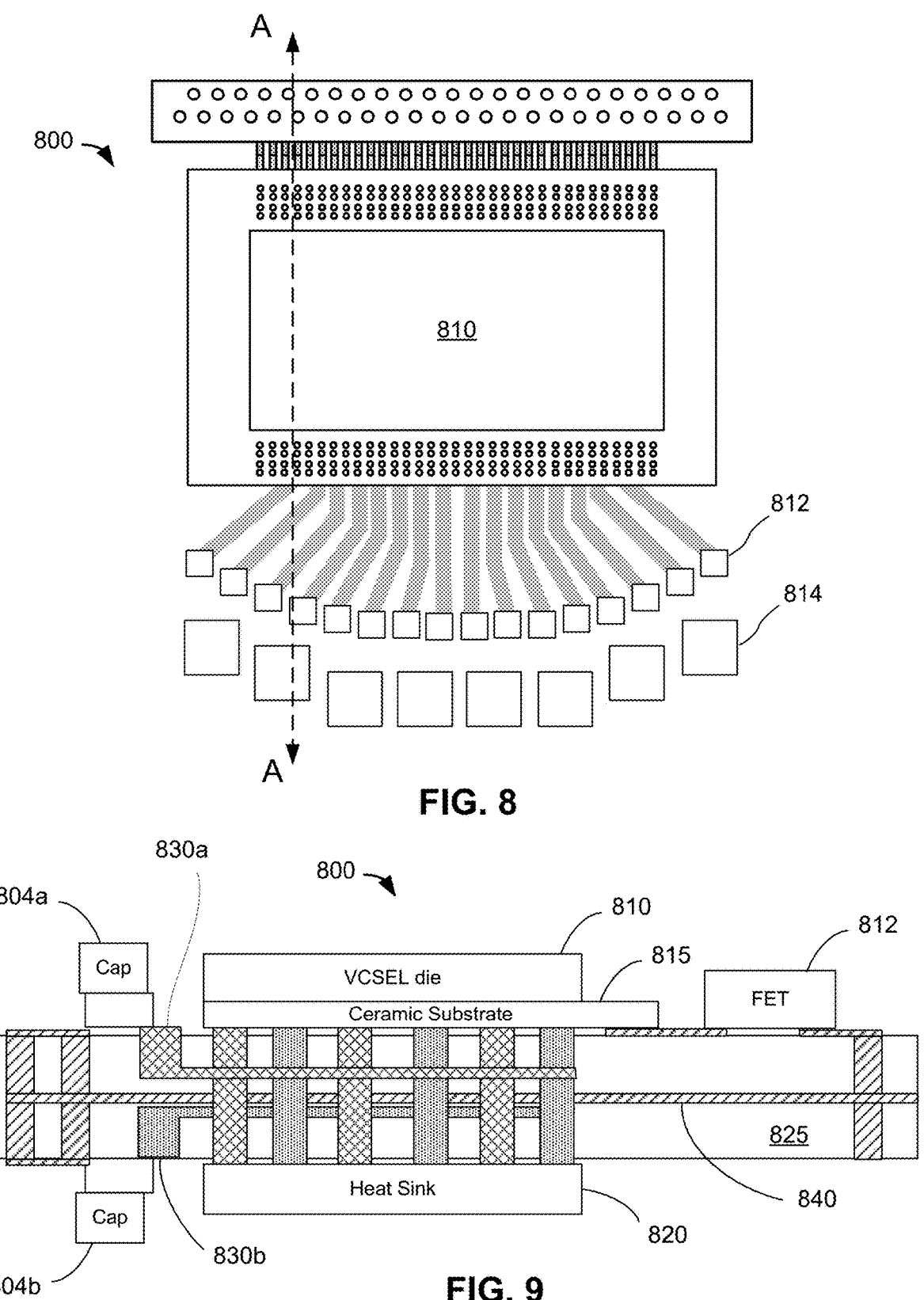
FIG. 8 is a simplified illustration of an electronically scanning laser array according to some embodiments of the invention.
FIG. 9 is a simplified cross-sectional view of the portion A-A in FIG. 8.

FIG. 8 is a simplified illustration that is intended to be drawn to a proper scale of an electronically scanning laser array 800 according to some embodiments of the invention that has a 12.8×6.4 mm emitter array 810 and 0402 capacitors (not shown in FIG. 8 for ease of illustration) on the high side. Emitter array 800 is an array of 128×256 emitters with 50 um spacing. As shown in FIG. 8, array 810 can include 16 independent drive channels (as indicated by the sixteen 0.9 mm FET drivers 812 and eight corresponding dual-channel gate drivers 814) such that each of the drivers 812 would typically be responsible for 16 columns of emitters.

Electronically scanning laser array 800, however, can further include two high-side switches (also not shown in FIG. 8 for ease of illustration) that enable each of the FET drivers 812 to drive eight laser columns at a time at an increased brightness as compared to driving 16 columns. In some embodiments, electronically scanning laser array 800 includes a 0402 capacitor for each channel that holds sufficient charge to fire eight columns of emitters from a 20V drive voltage. For example:

Energy consumed in a single laser shot: 1 watt peak power*10e-9 second*(128*8) emitters=10 micro joules Energy stored in a 1 uF capacitor at 20V=0.5*C*V^2=0.5*1e-620V^2=200 micro joules FIG. 9 is a simplified cross-sectional view of the portion A-A of electronically scanning laser array 800 in FIG. 8. Depicted in the cross-sectional view are VCSEL emitter array 810 mounted on a ceramic substrate 815, a heat sink 820, high-side capacitors 804a and 804b and FET drivers 812. Capacitors 804a and 804b are coupled to conductive rails 830a and 830b, respectively, which that provide electrical paths between a voltage source (not shown), the capacitors and the emitter array and enable the circuitry associated with each of the rails to be on opposite sides of printed circuit board 825. A ground plane 840 separates the two rails reducing inductance between the rails.

Some embodiments of the invention can save real estate within the emitter or laser array by using multi-channel gate drivers, multi-channel FET drivers and/or dual combined gate driver/FET driver chips. For example, each dual-channel gate driver 814 shown in FIG. 8 can be formed on a single IC such that there are eight ICs for the dual-channel gate drivers with each gate driver IC activating two channels of the emitter array. The eight gate driver ICs combine to take up less real estate within laser array 800 than would be required by sixteen single-channel gate drivers. Similarly, some embodiments of the invention can include multi-channel FET drivers in which a single FET chip can drive two or more channels of the emitter array and some embodiments can include dual combined gate driver/FET driver chips in which a single IC can include both a multi-channel gate driver and a multi-channel FET driver.

Embodiments of the present invention pertain to a LIDAR sensor that can, among other uses, be used for obstacle detection and avoidance in autonomous vehicles. Some specific embodiments pertain to LIDAR sensors that include design features that enable the sensors to be manufactured cheaply enough and with sufficient reliability and to have a small enough footprint to be adopted for use in mass-market automobiles, trucks and other vehicles. For example, some embodiments include a set of vertical-cavity surface-emitting lasers (VCSELs) as illumination sources that emit radiation into a field and include arrays of single-photon avalanche diode (SPAD) detectors as a set of photosensors (detectors) that detect radiation reflected back from a surface in the field. Using VCSELs as the emitters and SPADs as the detectors enables multiple measurements to be taken at the same time (i.e., the VCSEL emitters can be fired simultaneously) and also enables the set of emitters and the set of photosensors to each be fabricated on a single chip, greatly simplifying the manufacturing and assembly process.

Using VCSELs and SPADs in certain embodiments presents challenges, however, that various embodiments of the present invention overcome. For example, VCSELs are much less powerful than typical lasers used in existing LIDAR architectures and SPADs are much less efficient than the typical detectors used in the existing LIDAR architectures. To address these challenges, as well as challenges presented by firing multiple emitters simultaneously, certain embodiments of the invention include various optical components (e.g., lenses, filters, and an aperture layer), which may work in concert with multiple arrays of SPADs, each array corresponding to a different pixel (e.g., position in the field), as described herein. For example, as discussed herein with respect to FIG. 1, optical system 128 of light sensing module 108 can include a micro-optic receiver layer (not shown in FIG. 1) for enhancing the light detected by sensor array 126, which can include an array of photosensors, each of which can be an array of SPADs.

Figure 10:
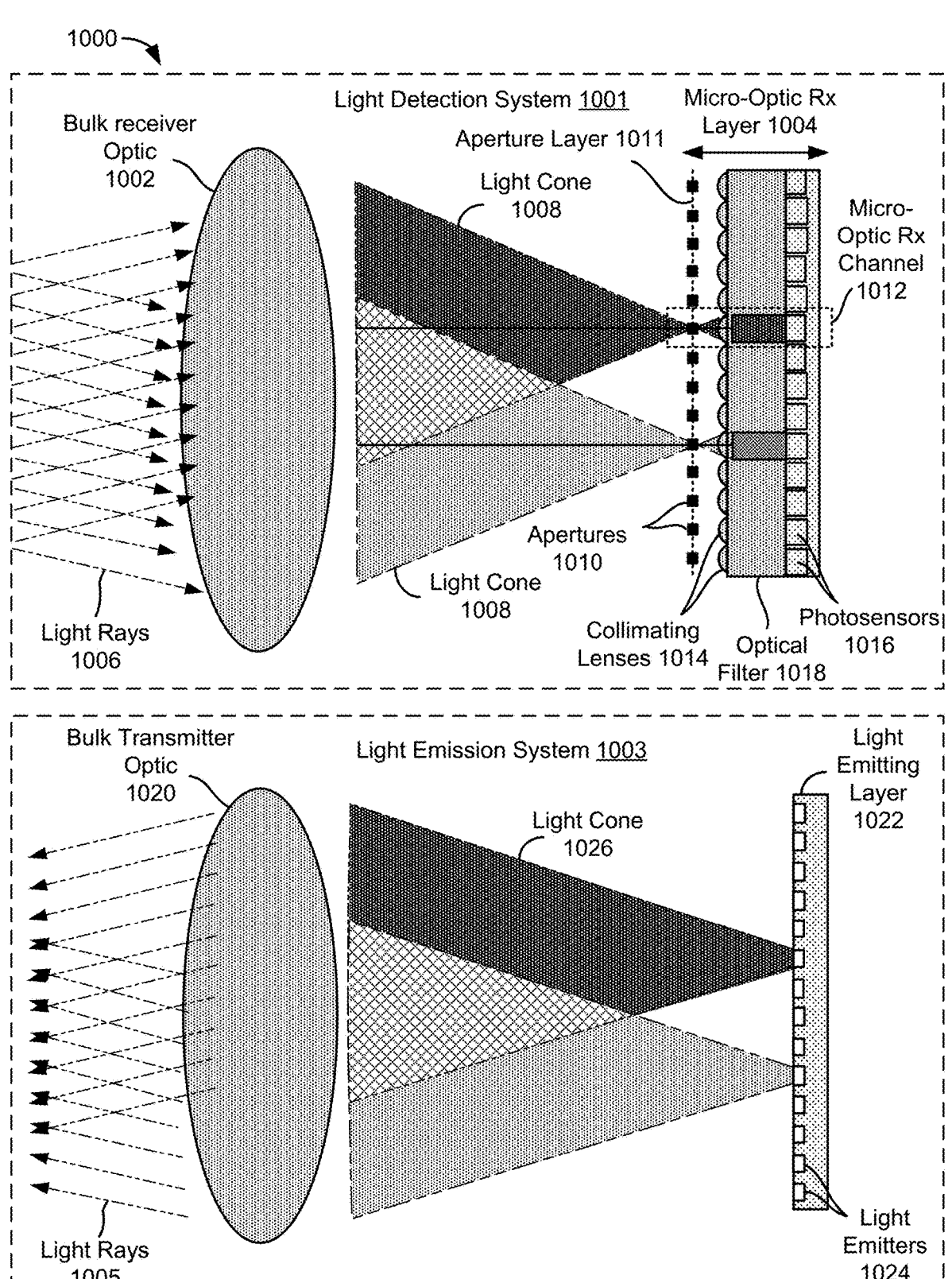
FIG. 10 is a simplified diagram illustrating a detailed side-view of an exemplary solid state electronic scanning LIDAR system according to some embodiments of the invention.

FIG. 10 is a simplified diagram illustrating a detailed side-view of an exemplary solid state electronic scanning LIDAR system 1000, according to some embodiments of the present invention. Solid state electronic scanning LIDAR system 1000 can include a light detection system 1001 and a light emission system 1003. Light emission system 1003 provides active illumination of at least a portion of a field in which system 1000 is positioned with narrowband light rays 1005. Light detection system 1001 detects the narrowband light emitted from the light emission system 1003 after it has been reflected by objects in the field as reflected light rays 1006.

Light detection system 1001 can be representative of light detection system 136 discussed above with respect to FIG. 1. Light detection system 1001 can include an optical sensing system and a sensor array. The optical sensing system can include bulk receiver optics, an aperture layer, a collimating lens layer, and an optical filter layer; and the sensor array can include an array of photosensors, where each photosensor can include one or more photodetectors for measuring light. According to some embodiments, these components operate together to receive light from a field. For instance, light detection system 1001 can include a bulk receiver optic 1002 and a micro-optic receiver (Rx) layer 1004. During operation, light rays 1006 enter bulk receiver optic 1002 from multiple directions and gets focused by bulk receiver optic 1002 to form light cones 1008. Micro-optic receiver layer 1004 is positioned so that apertures 1010 coincide with the focal plane of bulk receiver optic 1002. In some embodiments, micro-optic receiver layer 1004 can be a one-dimensional or two-dimensional array of micro-optic receiver channels 1012, where each micro-optic receiver channel 1012 is formed of a respective aperture 1010, collimating lens 1014, and photosensor 1016 positioned along the same axis in the direction of light transmission, e.g., horizontal from left to right as shown in FIG. 10. Furthermore, each micro-optic receiver channel 1012 can be configured various ways to mitigate interference from stray light between photosensors. During operation, each micro-optic receiver channel 1012 measures light information for a different pixel (i.e., position in the field).

At the focal point of bulk receiver optic 1002, light rays 1006 focus and pass through apertures 1010 in an aperture layer 1011 and into respective collimating lenses 1014. Each collimating lens 1014 collimates the received light so that the light rays all enter the optical filter at approximately the same angle, e.g., parallel to one another. The aperture and focal length of bulk receiver optic 1002 determine the cone angle of respective light rays that come to a focus at aperture 1010. The aperture size and the focal length of collimating lenses 1014 determine how well-collimated the admitted rays can be, which determines how narrow of a bandpass can be implemented in optical filter 1018. The aperture layer can serve various functions during the operation of light detection system 1000. For instance, (1) apertures 1010 can constrain the pixel field of view so it has tight spatial selectivity despite a large pitch at the photosensor plane, (2) apertures 1010 can constrain the field of view to be similar or equal in size to the emitter field of view for efficient use of emitter light, (3) the apertures can provide a small point-like source at the collimating lens's focal plane to achieve tight collimation of rays before passing through the filter, where better collimation results in a tighter band that can pass through the filter, and (4) the stop region of the aperture layer surrounding each aperture can reject stray light. In some embodiments, collimating lenses 1014 are not included, and the bandpass filter passband is less narrow.

Optical filter 1018 blocks unwanted wavelengths of light. Interference-based filters tend to exhibit strong angle dependence in their performance. For example, a 1 nm wide bandpass filter with a center wavelength (CWL) of 900 nm at a zero-degree angle of incidence might have a CWL of 898 nm at a fifteen-degree angle of incidence. Imaging systems typically use filters several tens of nanometers wide to accommodate this effect, so that the shift in CWL is much smaller than the bandpass width. However, the use of micro-optic layer 1004 allows all rays to enter optical filter 1018 at approximately the same angle of incidence, thus minimizing the shift in CWL and allowing very tight filters (e.g. less than 10 nm wide) to be used. Photosensor 1016 generates electrical currents or voltages in response to incident photons. In some embodiments, optical filter 1018 is uniform across the entire array of micro-optic receiver channels 1012 so that each individual micro-optic receiver channel 1012 in the array receives the same range of wavelengths of light.

In some embodiments, photosensors 1016 are positioned on a side opposite of collimating lenses 1014 so that light rays 1006 first pass through collimating lenses 1014 and optical filter 1018 before exposing on photosensors 1016. Each photosensor 1016 can be a plurality of photodetectors, such as a mini-array of multiple single-photon avalanche detectors (SPADs). An array of mini-arrays of SPADs can be fabricated on a single monolithic chip, thereby simplifying fabrication. In some alternative embodiments, each photosensor 1016 can be a single photodetector, e.g., a standard photodiode, an avalanche photodiode, a resonant cavity photodiode, or another type of photodetector.

Light emission system 1003 can include a bulk transmitter optic 1020 and a light emitting layer 1022 formed of a one- or two-dimensional array of light emitters 1024. Each light emitter 1024 can be configured to generate discrete beams of narrowband light. In some embodiments, light emitting layer 1022 is configured to selectively project the discrete beams of light through bulk transmitter optic 1020 according to an illumination pattern that matches, in size and geometry across a range of distances from light emission system 1003, the fields of view of the receiver channels in micro-optic receiver layer 1004. Light emitters 1024 can be any suitable light emitting device, such as a vertical-cavity surface-emitting lasers (VCSELS) integrated on one or more monolithic chip, or any other type of laser diode. Light emitters 1024 can produce cones of narrowband light 1026 that are directed to bulk transmitter optic 1020, which can collimate cones of light 1026 and then output the collimated light to distant targets in the field as emitted light rays 1005. In some embodiments, bulk transmitter optic 1020 is image-space telecentric.

As is evident from the illustration of parallel light rays 1005 and 1006 in FIG. 10, each micro-optic receiver channel 1012 has a non-overlapping field of view beyond a threshold distance. As shown in FIG. 10, each micro-optic receiver channel 1012 includes an aperture from the plurality of apertures, a lens from the plurality of lenses, and a photo-detector from the plurality of photodetectors, where the aperture of each channel defines a discrete field of view for the pixel in the channel that is non-overlapping beyond a threshold distance within the fields of view of the other micro-optic receiver channels. That way, each micro-optic receiver channel receives reflected light corresponding to a discrete position in the field that is not measured by any other micro-optic receiver channel in micro-optic receiver layer 1004.

In additional and alternative embodiments, light rays 1005 from light cones 1026 are focused on an intermediate plane in space by a micro-optic transmitter layer (not shown) before being directed to distant targets by the bulk transmitter optic 1020 to enhance the brightness and intensity of light emitted from light emission system 1003. In such embodiments, embodiments, light emission system 1003 and light detection system 1001 are configured such that each micro-optic transmitter channel (not shown) is paired with a corresponding micro-optic receiver layer 1004 and the centers of their fields-of-view are aligned to be overlapping at a certain distance from the sensor or their chief rays are made parallel. In further additional and alternative embodiments, the far-field beams of light emitted by light emission system 1003 are of similar size and divergence angle to the far-field fields-of-view of each micro-optic receiver layer 1004. Details of light emission systems 1003 having the micro-optic transmitter layer for enhancing brightness and intensity of outputted light will be discussed in detail below.

Because VCSELs are less powerful than typical lasers in some existing LIDAR architectures, in some embodiments, light emission system 106 can be configured to improve the ability of LIDAR system 100 to perform light ranging functionality. That is, the quality of light emitted by light emission system 106 can be enhanced to improve light ranging accuracy and efficiency. The quality of transmitted light for light ranging and imaging purposes can be defined in terms of brightness and intensity. The brightness and intensity of light rays emitted from bulk transmitter optic 144 can be enhanced by modifying and/or implementing one or more optic transmitter layers.

Figure 11:
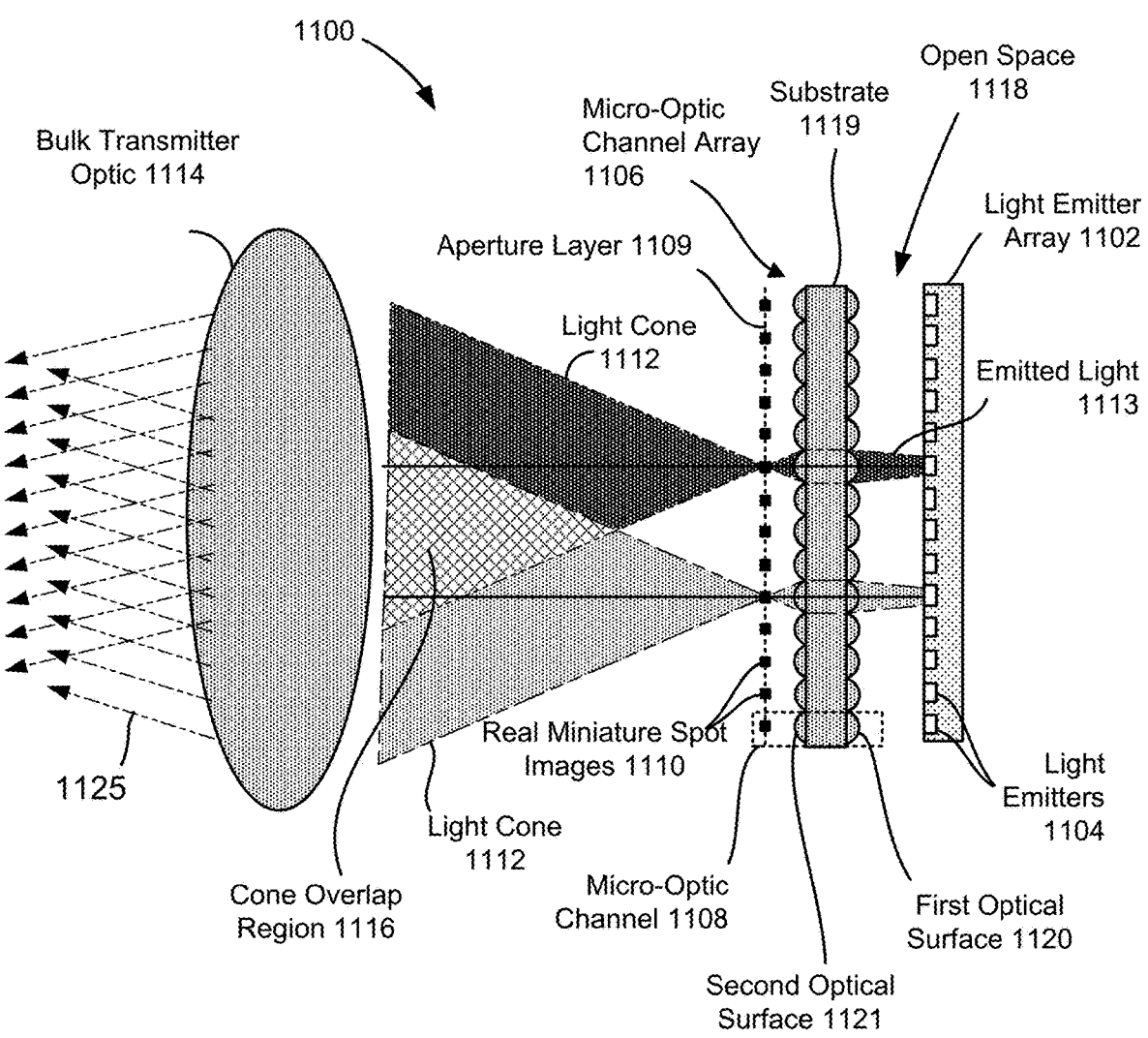
FIG. 11 is a simplified cross-sectional view diagram of an exemplary enhanced light emission system, according to some embodiments of the invention.

FIG. 11 is a simplified cross-sectional view diagram of an exemplary enhanced light emission system 1100, according to some embodiments of the present invention. Light emission system 1100 can include a light emitter array 1102 having light emitters 1104 that for example may comprise without limitation any of LEDs, laser diodes, VCSELs, or the like for emitting light 1113. A VCSEL is a type of semiconductor laser diode with laser beam emission perpendicular from the top surface. Note that the linear array shown in FIG. 11 can be any geometric form of emitter array, including and without limitation circular, rectangular, linear, or any other geometric shape.

Enhanced light emission system 1100 can include a micro-optic transmitter channel array 1106 separated from light emitter array 1102 by an open space 1118. Each micro-optic transmitter channel 1108 can be paired with a corresponding receiver channel (e.g., receiver channel 512 in FIG. 5) and the centers of their fields-of-view are aligned to be overlapping at a certain distance from the optical imager system. Micro-optic transmitter channel array 1106 can be formed of a substrate 1119 sandwiched between a first optical surface 1120 positioned on a side facing light emitter array 1102 and a second optical surface 1121 positioned on an opposite side facing away from light emitter array 1102. Both first and second optical surfaces 1120 and 1121 can each be configured as an array of convex, micro-optic lenses where each convex lens of first optical surface 1120 is configured to be optically aligned with a respective convex lenses of second optical surface 1120 so that light transmitting through first optical surface 1120 can subsequently be transmitted through second optical surface 1121. The corresponding convex lenses from first and second optical surfaces 1120 and 1121 can face away from one another as shown in FIG. 11. In certain embodiments, convex lenses of first optical surface 1120 have a first optical power and convex lenses of second optical surface 1121 have a second optical power different from the first optical power. For instance, the second optical power can be greater than the first optical power such that the focal length of the second optical power is shorter than the focal length of the first optical power. Substrate 1119 can be formed of any suitable material that is transmissive in the wavelength range of the light emitters 1104 such silicon, silicon dioxide, borosilicate glass, polymer, and the like. First and second optical surfaces 1120 and 1121 can be formed of a transparent polymer that is imprinted on respective opposite surfaces of substrate 1119.

In some embodiments, micro-optic transmitter channel array 1106 can be formed of a monolithic array of micro-optic transmitter channels 1108. Each micro-optic transmitter channel 1108 can include a first convex lens from first optical surface 1120, a corresponding second convex lens from second optical surface 1121, and a corresponding portion of substrate 1119 positioned between the two convex lenses. Each micro-optic transmitter channel 1108 can correspond with a respective light emitter 1104 so that light outputted from the light emitter 1104 first passes through the first convex lens, through the corresponding region of substrate 1119, and then through the second convex lens during operation.

Once light emits out of the second convex lens of second optical surface 1121, the light forms a miniature spot image 1110 that is a real image of the corresponding light emitter 1104 but a reduced-size of the corresponding light emitter 1104. In some embodiments, miniature spot images 1110 are positioned between micro-optic transmitter channel array 1106 and bulk transmitter optic 1114. For instance, miniature spot images 1110 can be formed within respective apertures of an aperture layer 1109. Each aperture can be a pin hole in a reflective or opaque layer in which emitted light focuses to form miniature spot images 1110. It is to be appreciated that aperture layer 1109 is optional and light enhancing capabilities of micro-optic transmitter channel array 1106 can be achieved without aperture layer 1109. In such embodiments, miniature spot images 1110 can be formed at a focal plane of the second convex lens of second optical surface 1121. From there, continuing away from both the light emitter and micro optic channel, the light forms a light cone 1112 reaching out towards bulk transmitter optic 1114.

According to some embodiments of the present invention, the degree of divergence of emitted light 1113 can be smaller than the degree of divergence of light cone 1112. This discrepancy in divergence can be created by a micro-optic transmitter channel 1108, specifically by the optical power of second optical surface 1121. Because the divergence of light out of micro-optic transmitter channel 1108 is larger than the divergence of emitted light 1113 from light emitters

1104, miniature spot image 1110 can be a real image of light emitter 1104 but a multitude smaller than the size of light emitter 1104 and with the same number of photons as emitted light 1113. The resulting light cone 1112 formed after the real spot images are formed then gets projected into the field as discrete beams of light 1125 for each light emitter 1104 after passing through bulk transmitter optic 1114. The resulting light rays emanating out of light emission system 1100 are highly collimated beams of light 1125 that have a small cross-sectional area, thereby resulting in a light emission system 1100 that can output light having enhanced brightness and intensity. In contrast, a system with no micro-optic channel array that instead has light emitter array 1102 at the focal plane of bulk transmitter optic 1114 would produce beams that are significantly less collimated, and these beams would therefore have a larger cross-sectional area in the far field.

Note that bulk transmitter optic 1114 can include either a single lens or a cluster of lenses where two or more lenses function together to form bulk transmitter optic 1114. The use of multiple lenses within the bulk transmitter optic 1114 could increase the numerical aperture, reduce the RMS spot size, flatten the image plane, improve the telecentricity, or otherwise improve the performance of bulk transmitter optic 1114. Note also that for some embodiments, light cones 1112 may overlap forming cone overlap region 1116.

Bulk transmitter optic 1114 is positioned in front of the micro-optic and emitting layers such that the focal plane of the bulk imaging optic coincides with miniaturized spot images 1110. Bulk transmitter optic 1114 accepts divergent light cone(s) 1112 and outputs a collimated beam. Its numeric aperture can be at least large enough to capture the full range of angles in the divergent ray cone(s). Also, bulk transmitter optic 1114 can be image-space telecentric, since light cone(s) 1112 exiting the micro-optic layer may all be parallel (rather than having their center axes aimed towards the center of the bulk optic). In one embodiment, light can exit bulk transmitter optic 1114 approximately collimated. Note that the quality of beam collimation relates to the size of the "emitting object" (miniature spot images 1110) at the focal plane. Since this "emitting object" size has been reduced by using a micro-optic stack, a better collimation angle is obtained than if the emitter object was simply imaged directly.

Although FIG. 11 shows an enhanced light emission system having a micro-optic channel array formed of a substrate sandwiched between first and second optical surfaces, and positioned a distance away from a light emitter array by an open space to improve the brightness and intensity of light outputted by the light emission system, embodiments are not limited to such configurations. Rather, other embodiments may not necessarily implement an open space or two optical surfaces, as discussed in further detail in related U.S. patent application Ser. No. 15/979,235, entitled "Optical Imaging Transmitter with Brightness Enhancement", filed on May 14, 2018, and incorporated herein by reference in its entirety for all purposes.

Electronic scanning LIDAR systems, according to some embodiments of the present invention, can be configured as a solid state system that has a stationary architecture. Such LIDAR systems do not rotate, and thus do not need a separate motor to rotate the sensor and transmitter modules. The field of view and resolution of a particular solid-state LIDAR system according to embodiments of the invention can depend on several interrelated factors, such as, but not limited to, size of the sensor array, pitch of the photosensors in the sensor array, pitch of the emitter array, size of the emitter array, and the pitch of the SPADs in a single photosensor. Larger sensor arrays can result in larger field of views where the size of the sensor pitch is constant. Additionally, smaller photosensor pitches can result in higher resolution images in instances where the size of the sensor array is constant, but can result in smaller fields of view.

To meet the requirements of some commercial LIDAR specifications, electrical scanning LIDAR systems can be designed various ways. For example, some commercial LIDAR specification require a minimum field of view of approximately 45 degrees in the horizontal direction and 22.5 degrees in the vertical direction, and a minimum resolution of approximately 256 pixels by 128 pixels. A scanning LIDAR system according to some embodiments of the invention can be designed to meet these requirements by being configured with a sensor array with an array of 256 by 128 photosensors. To keep the size of the array compact, the photosensor pitch can range between 50 to 70 um, particularly 60 um in certain embodiments in both the vertical and horizontal dimensions; and in embodiments where each photosensor is formed of an set of sixteen SPADs, the SPAD pitch can range between 5 to 15 um, particularly 10 um in certain embodiments. The resulting size of the sensor array can be approximately 15 mm×7.6 mm.

Figure 12:
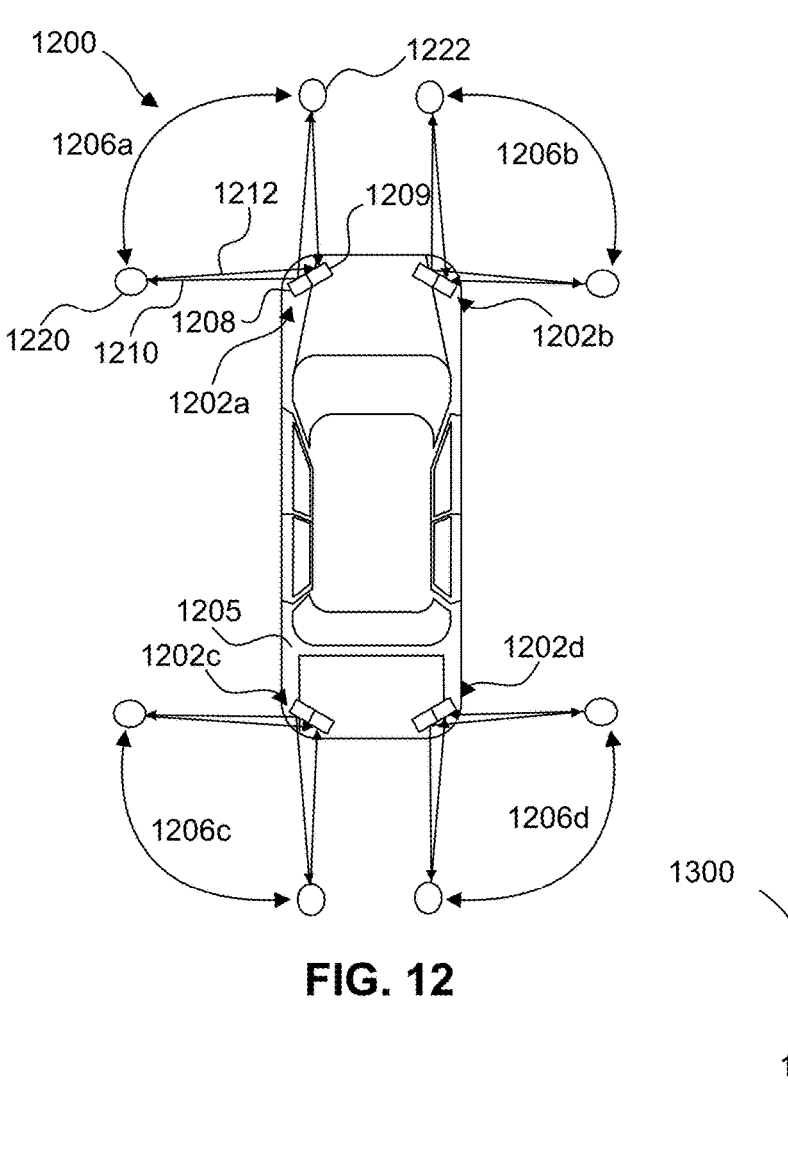
FIG. 12 is a simplified illustration of solid state electronic scanning LIDAR systems implemented at the outer regions of a road vehicle in accordance with some embodiments of the invention.
Figure 13:
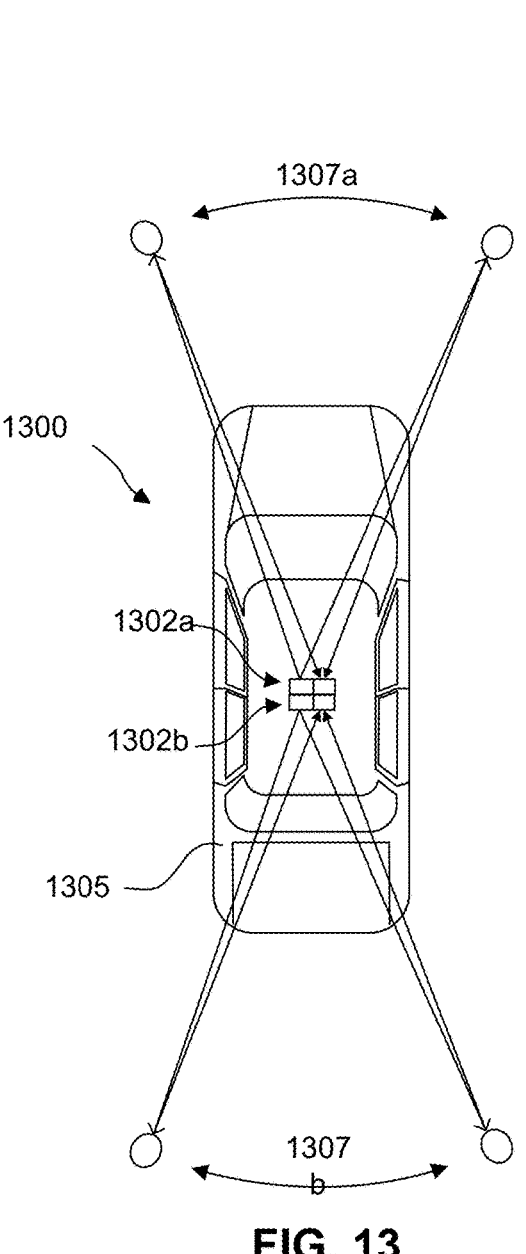
FIG. 13 is a simplified illustration of solid state electronic scanning LIDAR systems implemented on top of a road vehicle in accordance with some embodiments of the invention.

In some embodiments, multiple electrical scanning LIDAR units according to the present invention can work together to provide a larger field of view than a single unit. For example, FIG. 12 illustrates an implementation 1200 where solid state electronic scanning LIDAR systems 1202*a-d* are implemented at the outer regions of a road vehicle 1205, such as an automobile, according to some embodiments of the present disclosure; and FIG. 13 illustrates an implementation 1300 where solid state electronic scanning LIDAR systems 1302*a-b* are implemented on top of a road vehicle 1305, according to some embodiments of the present disclosure. In each implementation, the number of LIDAR systems, the placement of the LIDAR systems, and the fields of view of each LIDAR system can be chosen to obtain a majority of, if not the entirety of, a 360 degree field of view of the environment surrounding the vehicle. Automotive implementations for the LIDAR systems are chosen herein merely for the sake of illustration and the sensors described herein may be employed in other types of vehicles, e.g., boats, aircraft, trains, etc., as well as in a variety of other applications where 3D depth images are useful, such as medical imaging, mobile phones, augmented reality, geodesy, geomatics, archaeology, geography, geology, geomorphology, seismology, forestry, atmospheric physics, laser guidance, airborne laser swath mapping (ALSM), and laser altimetry.

With reference to FIG. 12, solid state electronic scanning LIDAR systems 1202*a-d* can be mounted at the outer regions of a vehicle, near the front and back fenders. LIDAR systems 1202*a-d* can each be positioned at a respective corner of vehicle 1205 so that they are positioned near the outermost corners of vehicle 1205. That way, LIDAR systems 1202*a-d* can better measure the distance of vehicle 1205 from objects in the field at areas 1206*a-d*. Each solid state LIDAR system can face a different direction (possibly with partially and/or non-overlapping fields of views between units) so as to capture a composite field of view that is larger than each unit is capable of capturing on its own. Objects within the scene can reflect portions of light pulses 1210 that are emitted from LIDAR Tx module 1208. One or more reflected portions 1212 of light pulses 1210 then travel back to LIDAR system 1202*a* and can be received by Rx module 1209. Rx module 1209 can be disposed in the same housing as Tx module 1208. As discussed herein, electronic scanning LIDAR systems 1202*a-d* can electronically scan a scene to capture images of the scene. Thus, LIDAR system 1202*a* can scan between points 1220 and 1222 to capture objects in the field at area 1206*a*, and likewise for systems 1202*b-d* and areas 1206*b-d*.

Although FIG. 12 illustrates four solid state electronic scanning LIDAR systems mounted at the four corners of a vehicle, embodiments are not limited to such configurations. Other embodiments can have fewer or more solid state electronic scanning LIDAR systems mounted on other regions of a vehicle. For instance, electronic scanning LIDAR systems can be mounted on a roof of a vehicle, as shown in FIG. 13. In such embodiments, electronic scanning LIDAR systems 1302*a-b* can have a higher vantage point to better observe areas 1307*a-b* around vehicle 1305. In some embodiments, the scanning can be implemented by other means, such as chip-based beam steering techniques, e.g., by using microchips that employ one or more MEMS based reflectors, such as a digital micromirror (DMD) device, a digital light processing (DLP) device, and the like.

As mentioned herein, the number of LIDAR systems, the placement of the LIDAR systems, and the fields of view of each LIDAR system can be chosen to obtain a majority of, if not the entirety of, a 360 degree field of view of the environment surrounding the vehicle. Accordingly, each LIDAR system 1202*a-d* can be designed to have a field of view of approximately 90 degrees so that when all four systems 1220*a-d* are implemented, a full or substantial majority of a 360 degree field of view around vehicle 1205 can be observed. In embodiments where each LIDAR system 1202*a-d* has less than a 90 degree field of view, such as a 45 degree field of view, additional LIDAR systems can be included as desired to extend the field of view to achieve a combined field of view as may be required by a particular implementation.

Although the present invention has been described with respect to specific embodiments, it will be appreciated that the present invention is intended to cover all modifications and equivalents within the scope of the following claims.

What is claimed is:

1. An electronically scanning emitter array comprising:
   a first high-side switch on a top side of a printed circuit board;
   a first capacitor on the top side of the printed circuit board;
   a first conductive rail coupled to the first capacitor and the first high-side switch and extending laterally through the printed circuit board;
   a second high-side switch on a bottom side of the printed circuit board;
   a second capacitor on a bottom side of the printed circuit board;
   a second conductive rail coupled to the second capacitor and the second high-side switch and extending laterally through the printed circuit board;
   an array of light emitters on the top side of the printed circuit board and comprising a first light emitter, a second light emitter, a third light emitter, and a fourth light emitter;
   a first plurality of vertical interconnects coupled between the first conducive rail and the array of light emitters and coupling the first light emitter and the third light emitter to the first conductive rail;
   a second plurality of vertical interconnects coupled between the second conducive rail and the array of light emitters and coupling the second light emitter and the fourth light emitter to the second conductive rail;

a plurality of low-side switches on the top side of the printed circuit board and coupled between one or more light emitters in the array of light emitters and ground and comprising a first low-side switch coupled to the first light emitter and the second light emitter and a second low-side switch coupled to the third light emitter and the fourth light emitter;

a first pull-down switch on the top side of the printed circuit board and coupled between the first conductive rail and ground; and a second pull-down switch on the bottom side of the printed circuit board and coupled between the second conductive rail and ground.

2. The electronically scanning emitter array of claim 1 wherein the printed circuit board comprises a ground plane extending laterally between the first conductive rail and the second conductive rail.

3. The electronically scanning emitter array of claim 2 wherein the array of light emitters is formed as an integrated circuit.

4. The electronically scanning emitter array of claim 3 further comprising a plurality of gate drivers on the top side of the printed circuit board and coupled to drive the plurality of low-side switches.

5. The electronically scanning emitter array of claim 4 wherein each of the plurality of gate drivers is coupled to drive two of the plurality of low-side switches.

6. The electronically scanning emitter array of claim 5 wherein the first plurality of vertical interconnects are coupled between the integrated circuit and a heat sink on the bottom side of the printed circuit board and the second plurality of vertical interconnects are coupled between the integrated circuit and the heat sink on the bottom side of the printed circuit board.

7. The electronically scanning emitter array of claim 6 wherein the integrated circuit is positioned on a ceramic substrate.

8. The electronically scanning emitter array of claim 7 wherein each of the first plurality of vertical interconnects is coupled to one or more columns of light emitters and each of the second plurality of vertical interconnects is coupled to one or more columns of light emitters, wherein the first plurality of vertical interconnects and the second plurality of vertical interconnects, along with their one or more columns of light emitters, are arranged in an interleaved manner.

9. The electronically scanning emitter array of claim 8 wherein each low-side switch is coupled to a column of light emitters that is coupled to one of the first plurality of vertical interconnects and an adjacent column of light emitters that is coupled to one of the second plurality of vertical interconnects.

10. An electronically scanning emitter array comprising:

a first high-side switch;

a first capacitor coupled to the first high-side switch;

a second high-side switch;

a second capacitor coupled to the second high-side switch;

a first plurality of columns of light emitters coupled to the first high-side switch and the first capacitor, the first plurality of columns of light emitters comprising a first column of light emitters and a third column of light emitters;

a second plurality of columns of light emitters coupled to the second high-side switch and the second capacitor, the second plurality of columns of light emitters comprising a second column of light emitters and a fourth column of light emitters;

a plurality of low-side switches, each low side switch coupled to at least one of the first plurality of columns of light emitters and at least one of the second plurality of columns of light emitters, the plurality of low-side switches comprising a first low-side switch coupled to the first column of light emitters and the second column of light emitters and a second low-side switch coupled to the third column of light emitters and the fourth column of light emitters;

a first pull-down switch coupled to the first high-side switch; and a second pull-down switch coupled to the second high-side switch.

11. The electronically scanning emitter array of claim 10 wherein each of the plurality of low-side switches is coupled to one of the first plurality of columns of light emitters and one of the second plurality of columns of light emitters.

12. The electronically scanning emitter array of claim 10 wherein the first high-side switch is coupled between the first capacitor and a power supply terminal and the second high-side switch is coupled between the second capacitor and the power supply terminal.

13. The electronically scanning emitter array of claim 10 further comprising a plurality of gate drivers coupled to drive the plurality of low-side switches, wherein each of the plurality of gate drivers is coupled to drive two of the plurality of low-side switches.

14. The electronically scanning emitter array of claim 10 wherein each of the first plurality of columns of light emitters and each of the second plurality of columns of light emitters comprises an emitter in series with a protection diode.

15. An electronically scanning emitter array comprising a control circuit to sequentially fire a first plurality of light emitters and then to sequentially fire a second plurality of light emitters, wherein the control circuit:

drives a first high-side switch coupled to the first plurality of light emitters, the first plurality of light emitters comprising a first light emitter and a third light emitter, and a second high-side switch coupled to the second plurality of light emitters, the second plurality of light emitters comprising a second light emitter and a fourth light emitter;

drives a plurality of low-side switches coupled to one of each of the first plurality of light emitters and the second plurality of light emitters, the plurality of low-side switches comprising a first low-side switch coupled to the first light emitter and the second light emitter and a second low-side switch coupled to the third light emitter and the fourth light emitter; and drives a first pull-down switch coupled to the first high-side switch and a second pull-down switch coupled to the second high-side switch.

16. The electronically scanning emitter array of claim 15 wherein the control circuit closes the first high-side switch to charge a first capacitor coupled to the first plurality of light emitters and the control circuit closes the second high-side switch to charge a second capacitor coupled to the second plurality of light emitters.

17. The electronically scanning emitter array of claim 16 wherein the control circuit sequentially closes the plurality of low-side switches to fire the first plurality of light emitters, and then again sequentially closes the plurality of low-side switches to fire the second plurality of light emitters.

18. The electronically scanning emitter array of claim 10 wherein the first low-side switch and the second low-side switch are further coupled directly to ground.

* * * * *